(12) United States Patent
Shum

(10) Patent No.: US 7,468,596 B2
(45) Date of Patent: Dec. 23, 2008

(54) BATTERY CHARGER FOR VARIOUS SIZES OF BATTERIES WITH SELECTION OF APPROPRIATE CHARGING POWER

(75) Inventor: King Mo Shum, Kwun Tong (HK)

(73) Assignee: Jeckson Electric Company Limited, Hong Kong (HK)

(*) Notice: Subject to any disclaimer, the term of this patent is extended or adjusted under 35 U.S.C. 154(b) by 0 days.

(21) Appl. No.: 11/282,219

(22) Filed: Nov. 17, 2005

(65) Prior Publication Data

US 2006/0103347 A1 May 18, 2006

Related U.S. Application Data

(60) Provisional application No. 60/629,039, filed on Nov. 18, 2004.

(51) Int. Cl.
*H02J 7/00* (2006.01)
(52) U.S. Cl. ........................... 320/110; 320/107
(58) Field of Classification Search ............... 320/106, 320/110, 113, 107
See application file for complete search history.

(56) References Cited

U.S. PATENT DOCUMENTS

| | | | | |
|---|---|---|---|---|
| 3,947,743 A | * | 3/1976 | Mabuchi et al. ............. | 320/103 |
| 4,766,361 A | * | 8/1988 | Pusateri ....................... | 320/110 |
| 4,816,735 A | * | 3/1989 | Cook et al. .................. | 320/110 |
| 5,543,702 A | * | 8/1996 | Pfeiffer ....................... | 320/110 |
| 5,686,811 A | * | 11/1997 | Bushong et al. ............. | 320/110 |
| 6,252,373 B1 | * | 6/2001 | Stefansson et al. .......... | 320/106 |
| 6,610,941 B2 | * | 8/2003 | Pfeiffer ................. | 200/61.58 R |
| 2003/0193312 A1 | | 10/2003 | Ramsden .................... | 320/107 |

FOREIGN PATENT DOCUMENTS

| | | |
|---|---|---|
| EP | 0 485 784 A2 | 5/1992 |
| EP | 0 629 032 A1 | 12/1994 |
| TW | 269727 | 6/1995 |

OTHER PUBLICATIONS

International Search Report dated Feb. 16, 2006.

* cited by examiner

*Primary Examiner*—Akm Enayet Ullah
*Assistant Examiner*—Aaron Piggush
(74) *Attorney, Agent, or Firm*—Ostrolenk, Faber, Gerb & Soffen, LLP

(57) ABSTRACT

A battery charger includes a housing for accommodating batteries to be recharged, and a plurality of charging channels, each configured to charge batteries of different sizes. Electrical connectors are located within the housing for receiving one or more batteries in each of the charging channels. A battery size detector detects the size of battery inserted in each channel. The charger further includes electronic circuitry for applying, independently to each channel, charging power appropriate to the battery size detected for the channel.

12 Claims, 21 Drawing Sheets

| | | 2 | 4 | 6 | 8 |
|---|---|---|---|---|---|
| AA/AAA | | | | | |
| C/D/9V | | 1 | 2 | 3 | 4 |
| Charge current (mA) | AA | 1/3×4000 | 1/3×4000 | 1/3×4000 | 1/4×4000 |
| | AAA | 1/3×2000 | 1/3×2000 | 1/3×2000 | 1/4×2000 |
| | C/D | 1/2×5000 | 1/2×5000 | 1/3×5000 | 1/4×5000 |
| | 9V | 23mA | 23mA | | |
| Discharge current | AA/AAA/C/D | 500mA | 500mA | 500mA | 500mA |

FIG 5

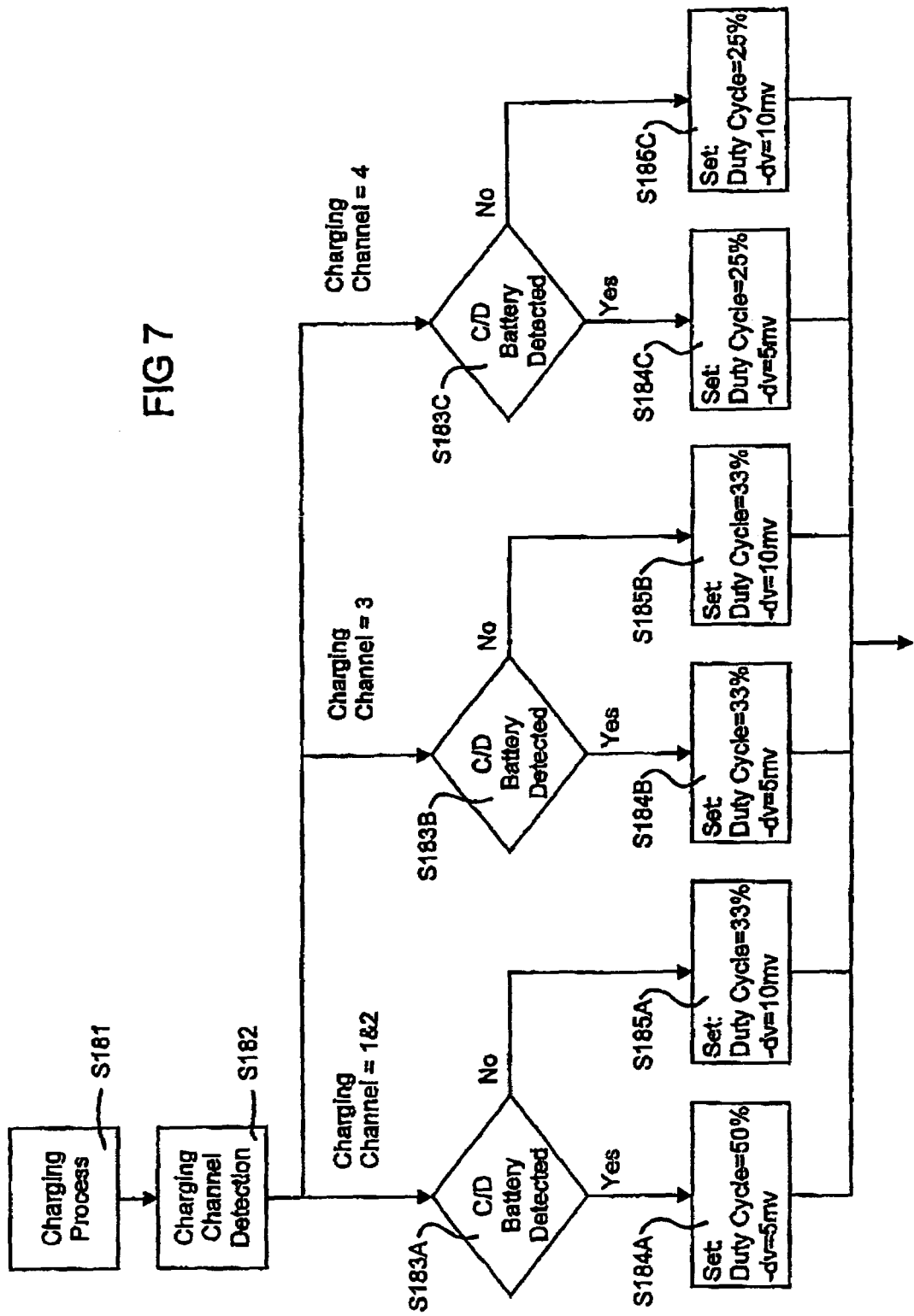

BATTERY CHARGER FOR VARIOUS SIZES OF BATTERIES WITH SELECTION OF APPROPRIATE CHARGING POWER

CROSS-REFERENCE TO RELATED APPLICATION(S)

This application claims the benefit of U.S. Provisional Patent Application No. 60/629,039 entitled, "Battery Charger" filed Nov. 18, 2004, the disclosures of which are expressly incorporated herein by reference to its entirety.

FIELD OF THE INVENTION

The present invention relates to a battery charger and more particularly to a battery charger that is capable of simultaneously charging a plurality of rechargeable batteries of different sizes.

BACKGROUND

As the community's awareness of environmental issues increases, use of rechargeable batteries becomes more common. Such use of rechargeable batteries includes use in portable electronic products, small-size home appliances and remote-controlled toys, and the like. Batteries of different sizes are needed for different use requirements. Furthermore, the local laws of some countries may require the sizes of batteries to comply with a particular standard. For instance, the sizes of commonly used batteries are designated as C, D, AA and AAA based on a former standard issued by the American National Standards Institute (ANSI).

Chargers that can simultaneously charge rechargeable batteries of sizes C, D, AA and AAA presently exist. However, due to restrictions on spacing, structure, cost, and other various restrictions, these existing chargers have limitations regarding what types of batteries may be charged simultaneously. For example, in some existing chargers, four batteries must be charged simultaneously, regardless of whether the batteries are of the larger sizes (C or D size batteries) or the smaller sizes (AA or AAA size batteries). Typical "universal" battery chargers have multiple channels which can take multiple batteries of different sizes, but each channel is limited to catering for one particular size of battery.

Accordingly, there remains a need for a battery charger that addresses these and other shortcomings of existing battery chargers.

SUMMARY OF THE INVENTION

In brief, the invention provides a battery charger which includes a housing for accommodating batteries to be recharged, and a plurality of charging channels, each configured to charge batteries of different sizes. Electrical connectors are located within the housing for receiving one or more batteries in each of the charging channels. A battery size detector detects the size of battery inserted in each channel. The charger further includes electronic circuitry for applying, independently to each channel, charging power appropriate to the battery size detected for the channel.

According to one embodiment, the present invention uses the space required for charging four large-size batteries, such as C or D size batteries, and allows for the charging of eight smaller-size batteries, such as AA or AAA size batteries. The capacity is provided for the charging of C, D, AA, and AAA size batteries in a number of charging combinations.

As will be realized, the invention is capable of other and different embodiments, and its several details are capable of modifications in various respects, all without departing from the invention. Accordingly, the drawings and description are to be regarded as illustrative in nature and not as restrictive.

BRIEF DESCRIPTION OF THE DRAWINGS

FIG. 5 is a table illustrating the recommended charging/discharging current for different combinations of batteries.

DETAILED DESCRIPTION

In the following description, reference is made to the accompanying drawings, which form a part hereof, and through which, by way of illustration, specific embodiments in which the invention may be practiced are shown. It is to be understood that other embodiments may be used as structural and other changes may be made without departing from the scope of the present invention.

Figure 1:
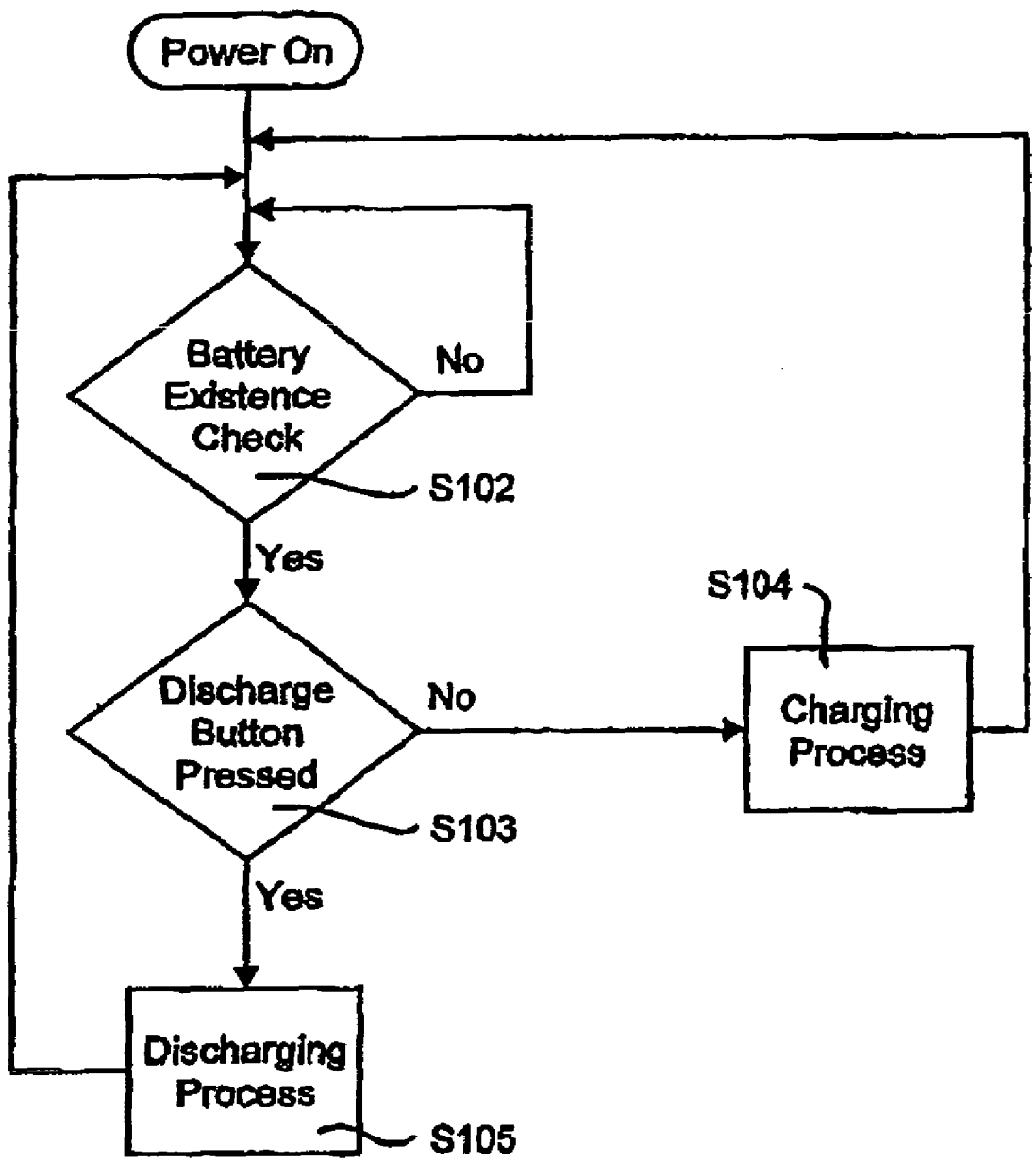
FIG. 1 is a flow diagram of the general operation of an embodiment of the present invention.

FIG. 1 shows a flowchart for the overall operation of the battery charger. The flowchart will be described with reference to one charging channel in the charger, however it will be appreciated that the flowchart applies to further charging channels in the battery charger. At step S101 the power status is checked and if there is power, control moves to step S102 which checks if a battery has been inserted into the charging channel of the battery charger. If a battery is not detected, there is no progression beyond step S102. Once a battery is detected in the charging channel the control moves to step S103 which detects whether or not the discharge button is pressed. If the discharge button is pressed the control moves to step S105 which discharges the battery. Throughout the discharge process at step S105, steps S102 and S103 are continuously checked.

If, at step S103, the discharge button is not pressed, the control moves to step S104 which starts a charging process. Throughout the charging process at step S104, steps S102 and S103 are continuously checked.

Figure 2:
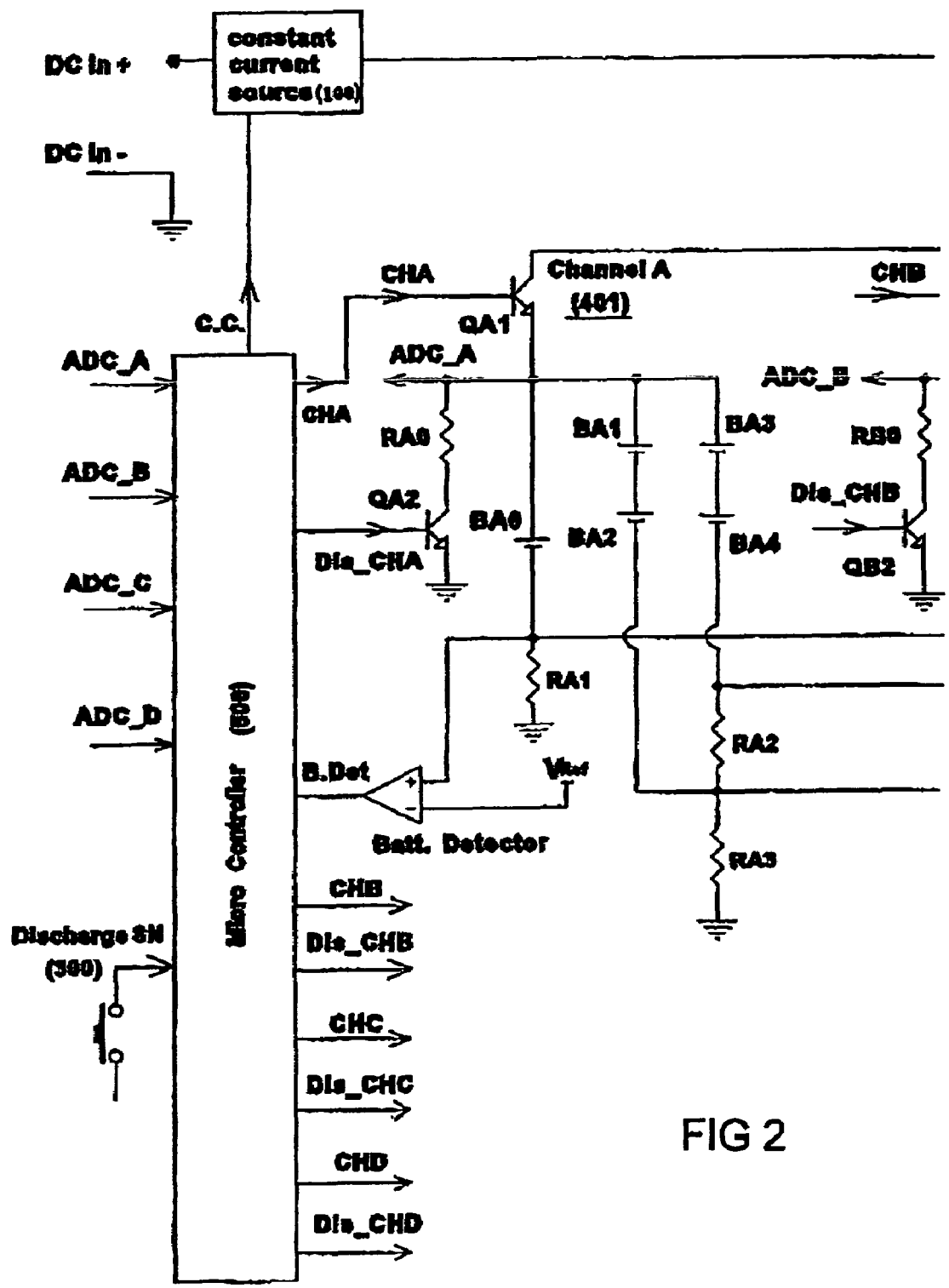
FIG. 2 is a circuit diagram of the electronic circuit of an embodiment of the present invention.
Figure 2:
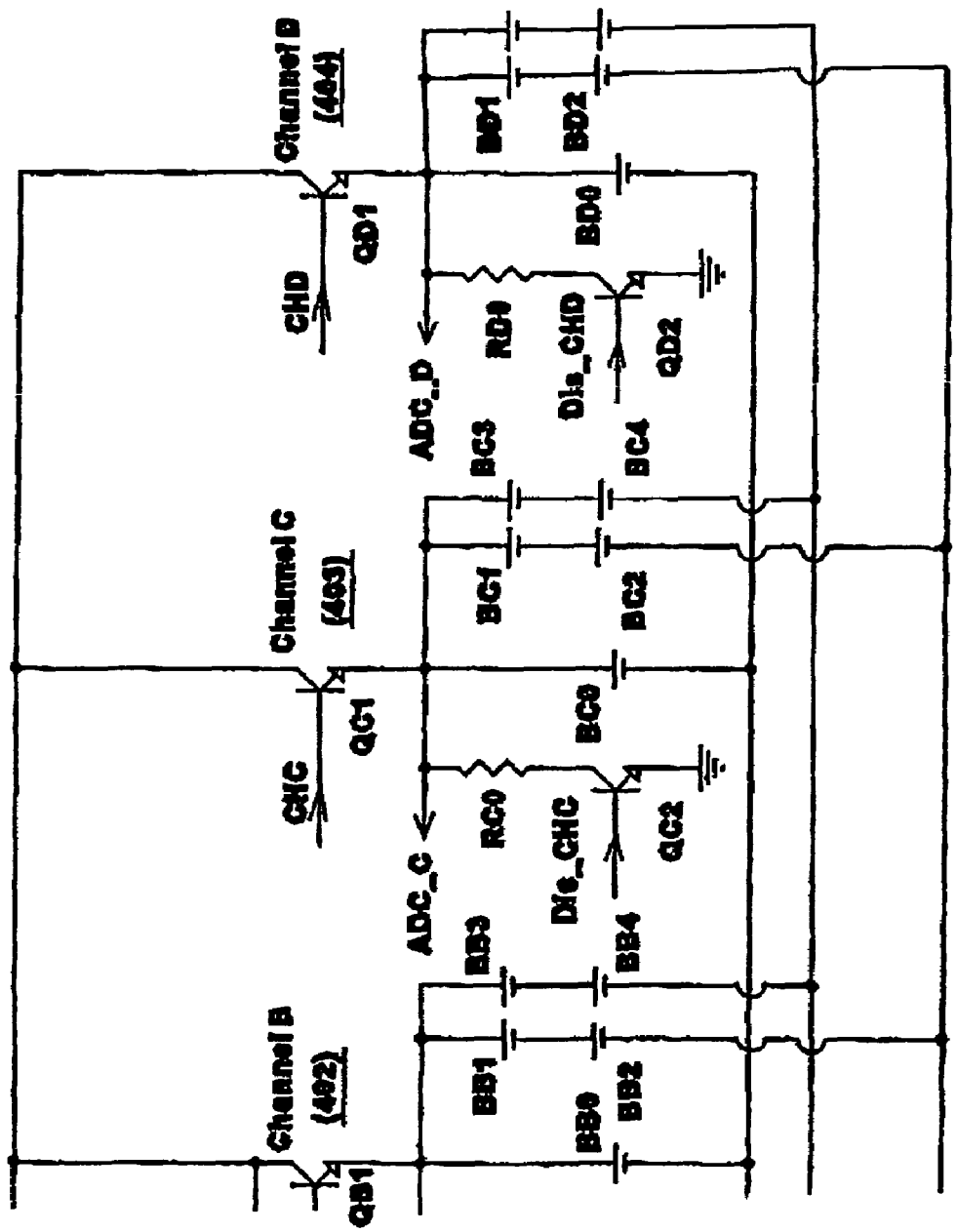

FIG. 2 is a circuit diagram of an electronic circuit of the present invention. In one embodiment, the electronic circuitry includes a constant current source 100, a battery type detector (Batt. Detector), a discharge button selector 300, four independent charging channels 401-404, and a microcontroller 500.

One function of the constant current source 100 is to provide a constant electric current for the charging channels 401-404. While four charging channels are illustrated, any desired number of charging channels may be included. The illustrated electronic circuitry may be adapted in accordance with the described embodiments to include the desired number of charging channels.

One function of the battery type detector is to detect whether one or more rechargeable batteries are placed at any of the charging routes or charging channels. for example, on Channel A, at BA0, BA1, BA2, BA3, or BA4, or a combination of locations.

One function of the discharge button 300 is to provide a user-selected choice of entering into a discharge mode. Discharge of the rechargeable batteries may be performed to achieve improved performance of the rechargeable batteries.

In one embodiment, the microcontroller 500 provides control over the processes of charging and discharging. For example, it decides whether to enter into discharge mode when a signal from the discharge button 300 is received. It also decides whether one or two batteries are placed at a charging route when a signal from the battery type detector is received, thereby controlling the electric current for charging or discharging. The microcontroller 500 also decides whether charging or discharging of the battery or batteries is completed according to the voltage shown at ADC and thereby controls the flow of current to and from the charging route. A number of different microcontrollers may be used. One example microcontroller suitable for use with the present invention is available from Toshiba under the model number TMP 87P809. However, any other suitable integrated circuits or controllers may be used.

The function of the four independent charging channels, Channel A through Channel D 401-404, are described with reference to charging channel A 401. Each one of Channel B, Channel C, and Channel D functions similar to the function described with reference to charging Channel A. Each channel may operate independently by way of time divisional multiplex control performed by the microcontroller 500. Thus, as each charging channel may operate independently, any number of charging channels may be included, each operating similar to the described operation of charging Channel A.

In one embodiment, charging Channel A includes a charging controller QA1, a discharging controller QA2, cells or batteries BA0, BA1, BA2, BA3, and BA4, and current sensor RA1. Battery BA0 is either a C or D size battery. Each of battery BA1 and battery BA2 is a AA size battery. Each of battery BA3 and battery BA4 is a AAA size battery. While five cells or batteries are shown in the diagram illustrated in FIG. 2, due to the structural design of the battery charger and associated circuitry, five rechargeable batteries are not simultaneously present in the battery charger. A rechargeable battery at either BA0 alone, or rechargeable batteries BA1 and BA2 together, or BA3 and BA4 together, will be present at one time.

During the charging process, the microcontroller 500 produces a control signal causing QA1 to open. Charging current flows from constant current source 100 and passes through QA1 to reach the positive end of the battery or batteries being charged. The current then passes through the battery, the negative end of the battery and the current sensor RA1 (or RA2 and/or RA3, depending on which batteries are being charged). In one embodiment of the present invention, each charging channel can charge three different size combinations of batteries, including (1) one C or D size battery as battery BA0, (2) two AA size batteries as battery BA1 and battery BA2, or (3) two AAA size batteries as battery BA3 and BA4. In order to avoid discharging two batteries toward a single battery (i.e. simultaneously placing either battery BA0 and two batteries BA1 and BA2 in the same charging channel, or simultaneously placing battery BA0 and two batteries BA3 and BA4 in the same charging channel), the structural design of the present invention, as described below, prevents three batteries from being located in position in the charging channel at the same time. It is desirable that mixed types of batteries are not simultaneously located within one charging channel. Since different size batteries have a different resistance, in a closed circuit, charge would flow from the batteries with higher resistance to the battery or batteries with lower resistance. Embodiments of the present invention may prevent the occurrence of such a result.

During the discharging process, the microcontroller 500 produces a control signal causing QA1 to close and QA2 to open. Discharging current flows from the positive end of the battery BA0 (or batteries BA1 and BA2, or batteries BA3 and BA4) and passes through RA0, QA2, and the current sensor RA1 (or RA2 and/or RA3, depending on which batteries are being charged) to reach the negative end of the battery or batteries.

Figure 3:
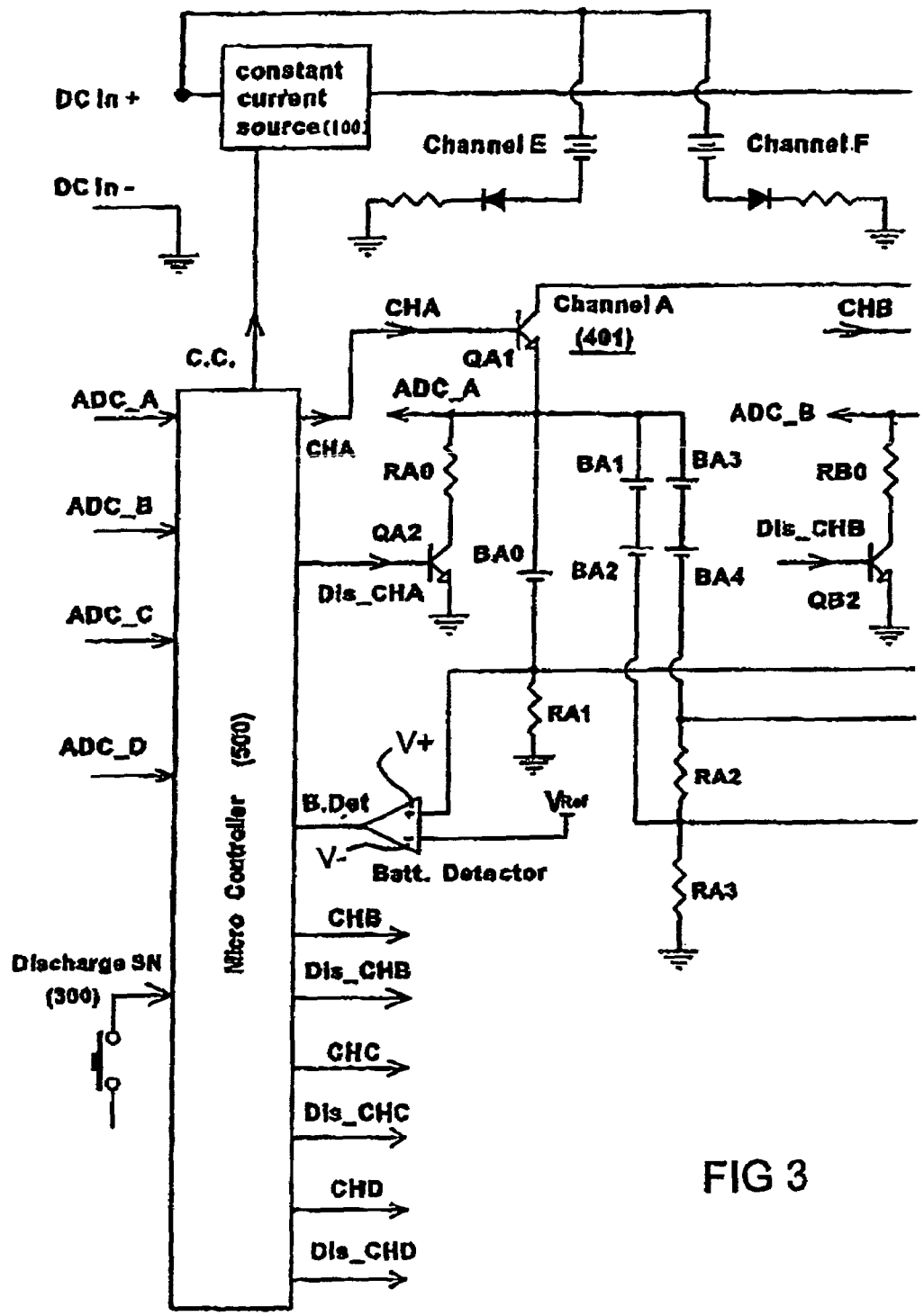
FIG. 3 is a circuit diagram of an electronic circuit in accordance with another embodiment of the present invention, including additional charging channels.
Figure 3:
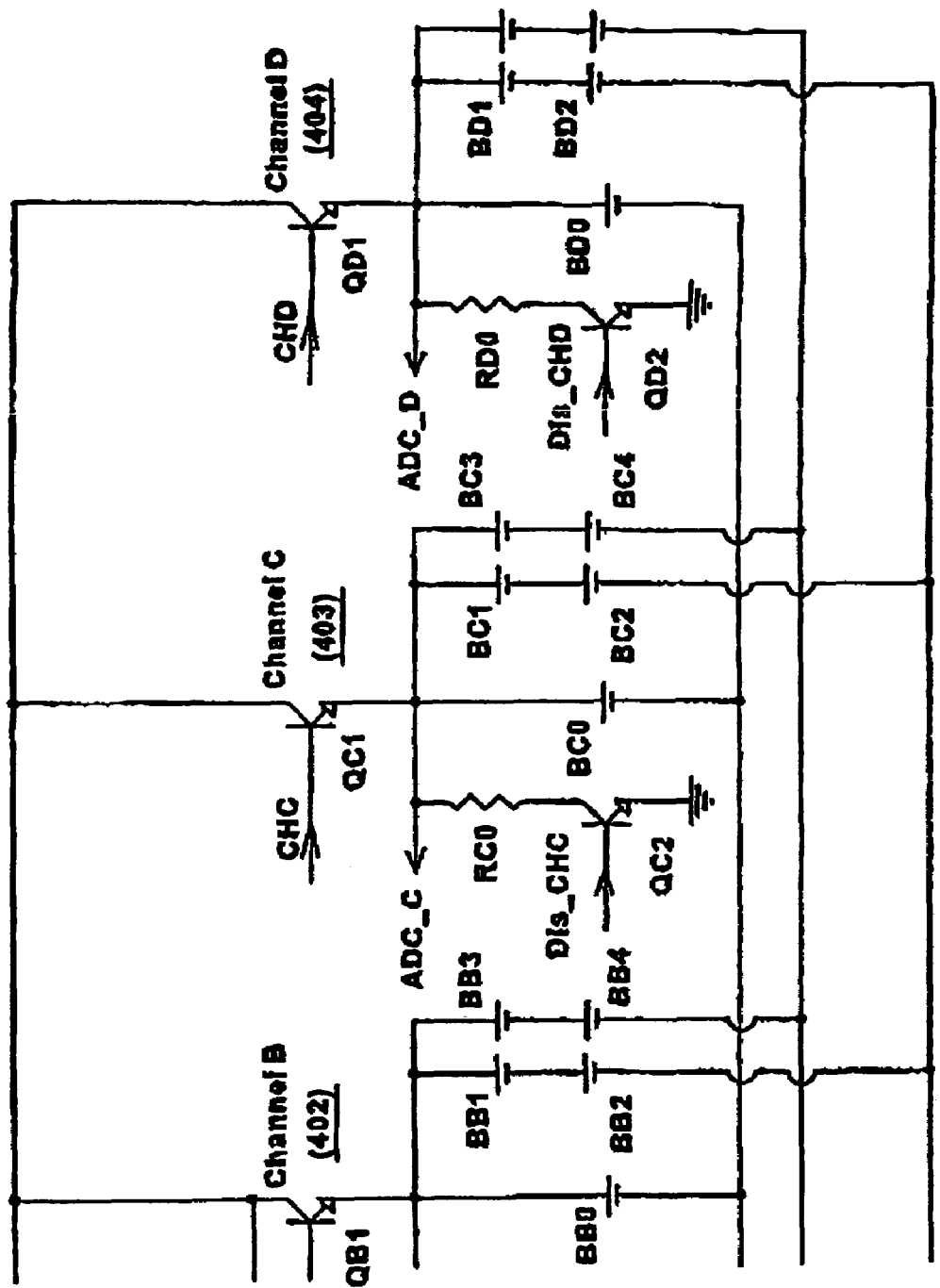

FIG. 3 is a circuit diagram of an electronic circuit in accordance with another embodiment of the present invention, including additional charging channels. FIG. 3 includes Channel E and Channel F. In one embodiment, Channel E and F may each be used for charging one 9-Volt battery. As Channels E and F are similarly independent charging channels, each may operate alone or simultaneously with the charging of other charging channels.

FIG. 3 also includes a battery detector (Batt.Detector) to detect whether one or more rechargeable batteries are placed at any of the charging routes or charging channels, and to distinguish between:

(1) C/D size batteries; and
(2) AA/AAA size batteries.

The battery detector (Batt.Detector) can be a comparator device such as an Operational Amplifier (Op-Amp). The inverting input V− of the Op-Amp is connected to a voltage reference $V_{ref}$. When a C or D size battery is inserted into a charging channel (for example charging channel 401), current flows through resistor RA1 which causes the voltage of the non-inverting input V+ to become higher than the voltage at the inverting input V−. This causes the output of the battery detector B.Det to become high (approximately 5 volts). The high signal is sent from B.Det to the microcontroller 500. The microcontroller 500 then treats the charging channel as containing either a C size or D size battery. It will be noted that, for charging purposes, C and D size batteries are treated the same. Alternatively, when the microcontroller 500 detects a low output signal (approximately 0 volts) from the battery detector B.Det, it treats the charging channel as containing either an AA or AAA size battery.

Figure 4:
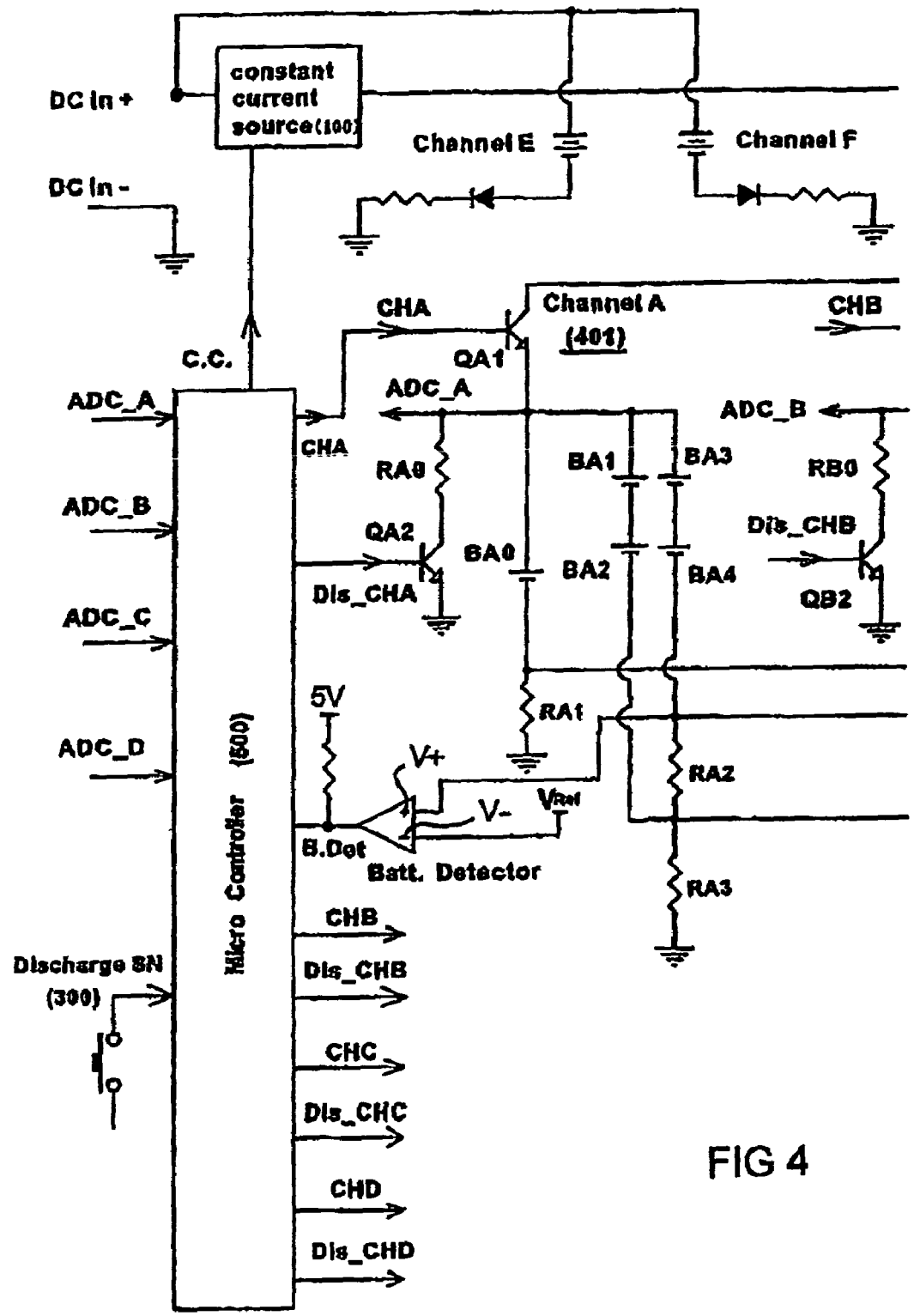
FIG. 4 is a circuit diagram of an electronic circuit in accordance with another embodiment of the present invention, including an alternate battery detector.
Figure 4:
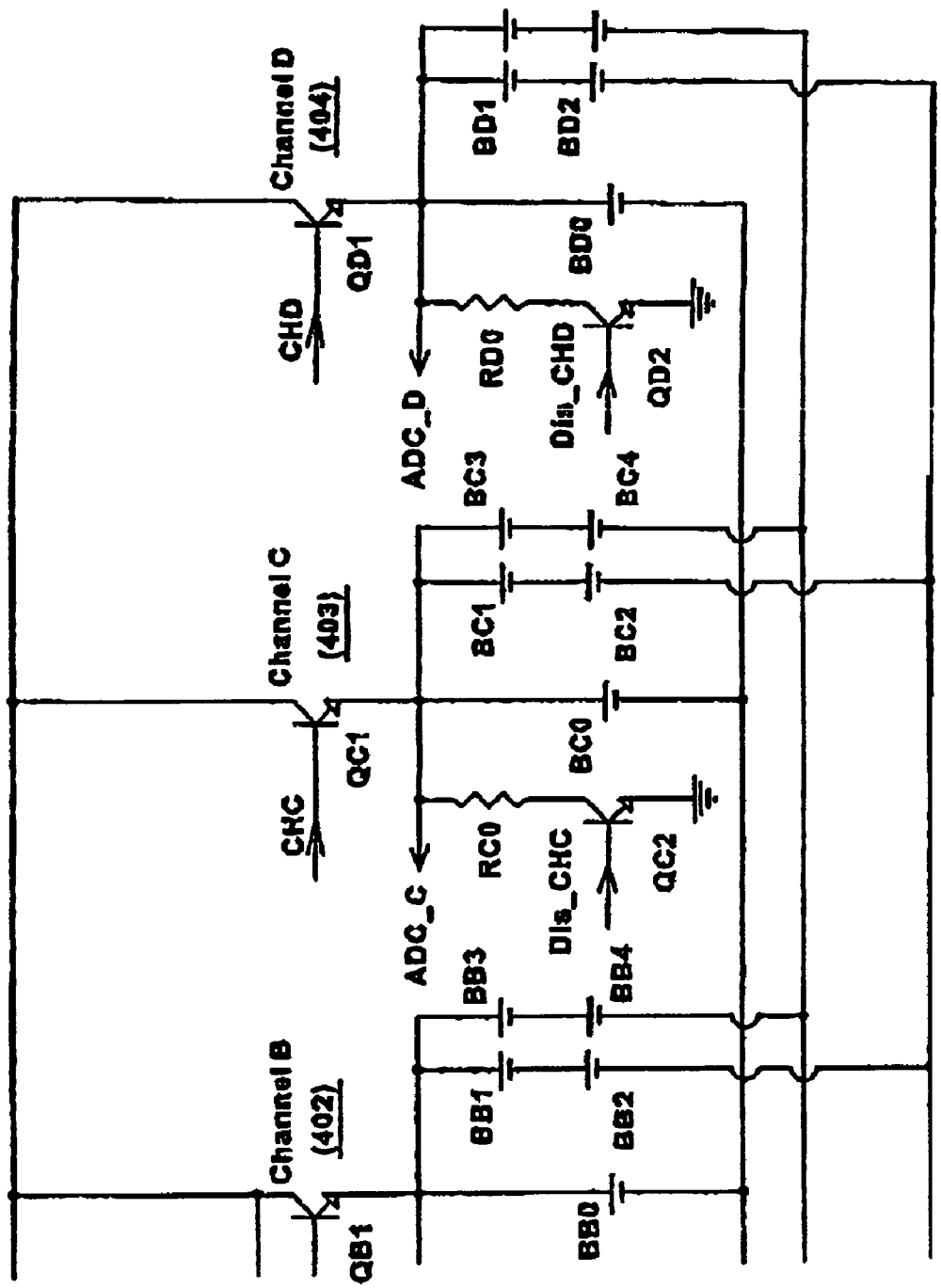

FIG. 4 is a circuit diagram of an electronic circuit in accordance with another embodiment of the present invention, including an alternative battery detector where the inverting input V− is connected to a voltage reference Vref and the non-inverting input V+ of the battery detector is connected to RA2 and RA3. When an AA, AAA, C or D battery is inserted into the charging channel, the Op-Amp compares the value at V+ relative to Vref and outputs a high or low signal at B.Det depending on whether an AA/AAA or C/D battery has been inserted into the charging channel. The signal sent from B.Det is interpreted by the microcontroller 500 and the microcontroller 500 treats the charging channel as containing either an AA/AAA or C/D size battery.

With regard to FIGS. 2, 3 and 4, while RA1, RA2 and RA3 are shared amongst all four charging channels (401-404), it will be appreciated that battery type detection and charging and discharging control of each charging channel may operate independently by way of time divisional multiplex control performed by the microcontroller 500.

The regulation of the charging current from the current source 100 to each charging channel (401-404) for different sized batteries will be described with reference to FIG. 2. FIG. 5 is a table illustrating the different values of charging current that are used according to the different sizes of battery and different number of batteries being charged.

The charging current in each charging channel (401-404) is regulated by controlling:

(1) the amplitude of the current generated from the constant current source 100 and;

(2) the duty cycle of the charging controller of each charging channel (i.e. QA1, QB1, QC1 and QD1 as shown in FIG. 2).

The charging/discharging current for different combinations of battery sizes and numbers of battery is summarized in the table in FIG. 5. With reference to the table in FIG. 5, the amplitude of the charging current to be delivered by the constant current source 100 are set at 4,000 mA, 2,000 mA and 5,000 mA for AA, AAA and C/D size batteries respectively. Please note that for charging, C and D size batteries have the same charge current (5000 mA), and for discharging, all battery sizes have the same discharge current of 500 mA.

The constant current control (as shown in FIG. 2) operates to provide current to each of the charging channels and provides the appropriate amount of current to the charging channel based on the battery that is inserted into the charging channel to be charged.

The constant current control outputs the appropriate current for each particular size of battery by way of RA1, RA2 and RA3 as shown in FIG. 2. RA1, RA2 and RA3 act as charging current sensing resistors. For example, when C or D size battery is inserted into a charging channel, voltage is induced by the current passing through RA1 which will be compared (via an Op-Amp or comparator) with a reference voltage in the constant current control. The output of the Op-Amp in turn controls state of transistors in the constant current control so that the duty cycle is regulated at a specific ratio and hence the amplitude of the current generated from the constant current source 100 is regulated at a specific level set for C/D size battery (as set out in the table of FIG. 5).

Similarly, when an AA size battery is inserted into the charging channel, charging current passing through RA3 will induce a voltage which will be passed to another Op-Amp in the constant current source 100 for comparison, which regulates the amplitude of the current generated from the constant current source 100 for the AA size battery.

Similarly, when an AAA size battery is inserted into the charging channel, charging current passing through RA2 and RA3 will induce a voltage which will be passed to a further Op-Amp in the constant current source 100 for comparison, which regulates the amplitude of the current generated from the constant current source 100 for the AAA size battery.

In addition to the charging current being regulated by controlling the amplitude of the current generated from the constant current source 100, the charging current in each charging channel (401-404) is also controlled by controlling the duty cycle of each charging controller of each charging channel (QA1, QB1, QC1 and QD1 as shown in FIG. 2).

As shown in the table of FIG. 5, the amplitude of the charging current to be delivered by the constant current source 100 is set at 4,000 mA, 2,000 mA and 5,000 mA for AA, AAA and C/D size batteries respectively. With respect to duty cycle, if, for example, each of all the four charging channels (Channels A, B, C and D as shown in FIG. 2) are inserted with either a C or D size battery (noting that for charging, C and D size batteries are treated the same), the duty cycle of the charging controller in each charging channel QA1, QB1, QC1 and QD1) will be 25% (¼) resulting in an average charging current of 1,250 mA (¼×5,000 mA) in each charging channel.

If only 2 charging channels (for example Channels A and B) are each inserted with either a C or D size battery, the duty cycle of the charging controller in each charging channel will be 50% (½) resulting in an average charging current of 2,500 mA (½×5,000 mA).

When 4 charging channels (Channels A, B, C and D as shown in FIG. 2) are inserted with different size of batteries, for example, an AA size in charging channel A, an AAA size in charging channel B, a C size in charging channel C and a D size in charging channel D, then by way of time divisional multiplex control performed by the microcontroller 500, charging current in each charging channel can be regulated independently by controlling the duty cycle of the charging controller (QA1, QB1, QC1, QD1) in each charging channel.

Thus, the duty cycle of QA1 in charging channel A will be 25% (¼) resulting in an average current of 1,000 mA (i.e. 25% of its charge current of 4000 mA which is based on the battery detector and the current sensing resistor RA3 identifying an AA battery and communicating this to the microcontroller 500 and the constant current source 100 respectively as described above).

The duty cycle of QB1 in charging channel B will be 25% (¼) resulting in an average charging current of 500 mA (i.e. 25% of its charge current of 2000 mA based on the battery detector and the current sensing resistors RA2, RA3 identifying an AAA battery and communicating this to the microcontroller 500 and the constant current source 100 respectively as described above).

The duty cycle of QC1 of charging channel C will be 25% (¼) resulting in an average charging current of 1,250 mA (i.e. 25% of its charge current of 5000 mA based on the battery detector and the current sensing resistor RA1 identifying a C battery and communicating this to the microcontroller 500 and the constant current source 100 respectively as described above).

The duty cycle of QD1 of charging channel D will be 25% (¼) resulting in an average charging current of 1,250 mA (i.e. 25% of its charge current of 5000 mA based on the battery detector and the current sensing resistor RA1 identifying a D battery and communicating this to the microcontroller 500 and the constant current source 100 respectively as described above).

Figure 6:
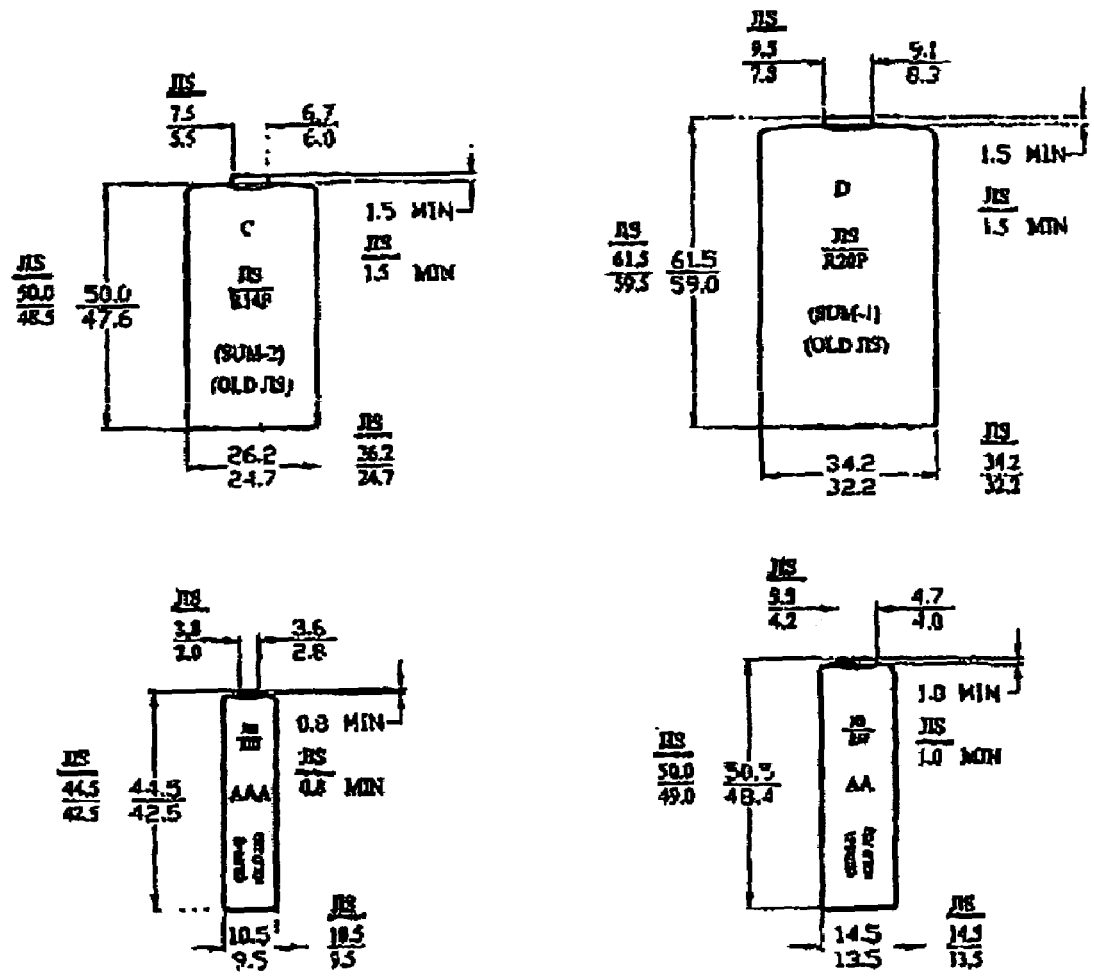
FIG. 6 is a block diagram illustrating the ANSI (American National Standards Institute) and JIS (Japanese Industrial Standard) standards for battery dimensions.

FIG. 6 is a diagram illustrating the ANSI (American National Standards Institute) and JIS (Japanese Industrial Standard) standards for battery dimensions JIS information (marked "JIS) is added to ANSI information (unmarked) for the sake of comparison. All dimensions are converted to millimeters.

Figure 7:
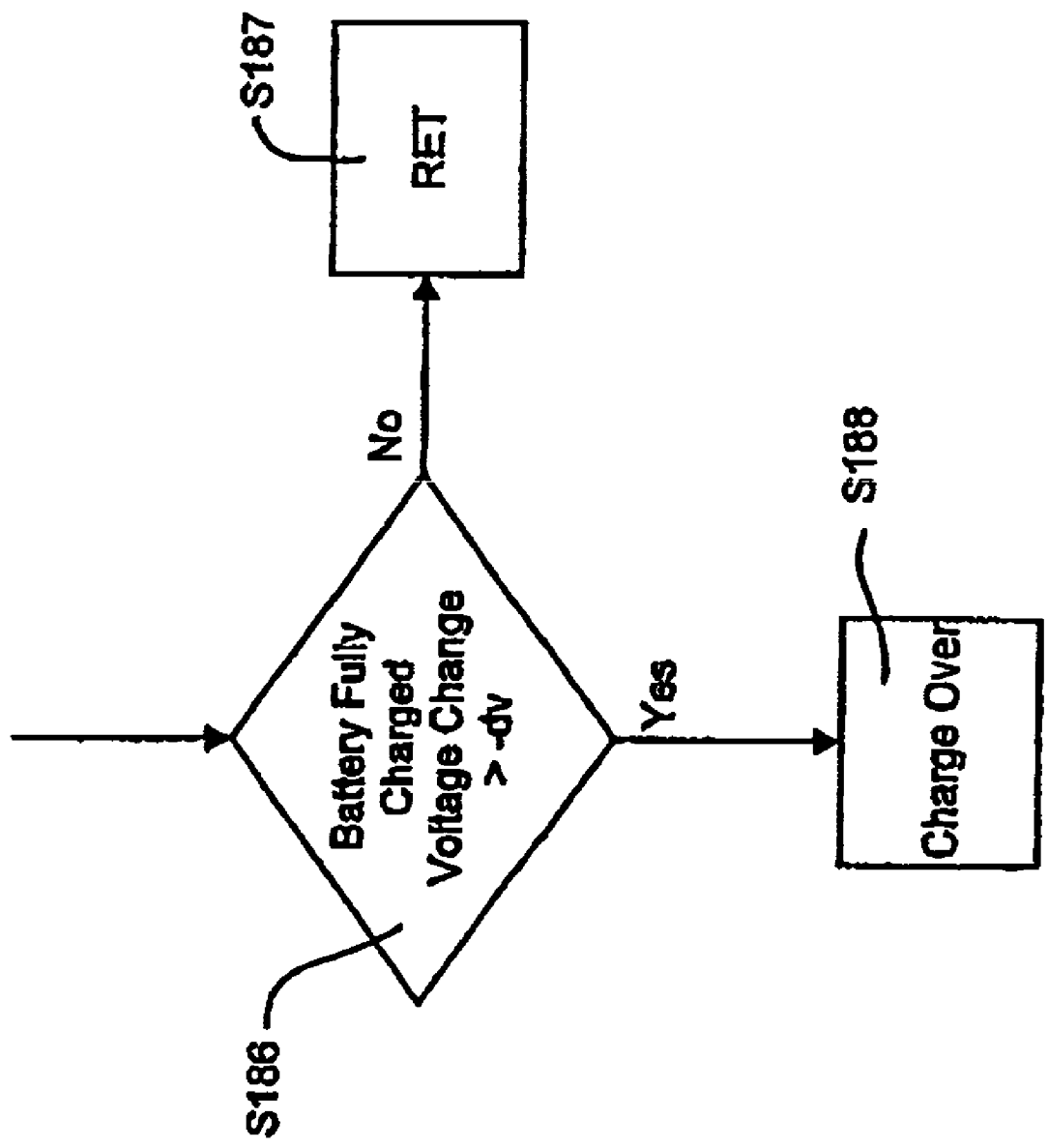
FIG. 7 is a flow diagram of the charging operation of an embodiment of the present invention.

FIG. 7 shows a flowchart for the charging process described above. The charging process will be described with reference to one charging channel but may be applied to more than one charging channel. The charging process is entered at step S181 (assuming the power is on, a battery is inserted into the charger and the discharge button is not pressed). Following step S181, is step S182 which detects how many charging channels are in use. Please note, while only four charging channels are described in the flowchart, it will be appreciated that this process can apply to more than four charging channels. In the case of either one or two charging channels are in use, step S183A then detects whether a C/D size battery is in the charging channel. If a C/D size battery is detected in the charging channel, the duty cycle is set to 50% (because only 1 or 2 charging channels are in use, the duty cycle of the charging controller in the charging channel will be 50% resulting in an average charging current of 2,500 mA which is 50% of 5,000 mA as shown in the table in FIG. 5. It does not matter what the battery size is in the other charging channel as the duty cycle of the charging controller in each of the charging channels will be set according the battery size detected in each of the charging channels). The change in voltage –dv is set to 5 mV.

During a normal charging process for a nickel metal hydride battery or a nickel cadmium battery, the battery voltage steadily increases as the battery is charged by a constant current. When the battery becomes fully charged, the battery voltage drops by a small amount. This small voltage change, referred to as –dv, can be used to detect the end of the charging process.

If at step S183A a C/D size battery is not detected in the charging channel, then there is a possibility of either two AA or two AAA batteries in the charging channel, thus, the duty cycle of the charging controller of the charging channel in operation is set to 33% and the change in voltage –dv is set to 10 mV (5 mV×2 cells).

Similar steps as described above are carried out if at step S182 it is detected that three charging channels are in use (S183B) or that four charging channels are in use (S183C) with appropriate setting of the duty cycle of the charging controller and the change in voltage –dv in each of the charging channels according to the battery size detected in each of the charging channels as shown in FIG. 7.

Following setting of the duty cycle of the charging controller and the change in voltage –dv the charge of the battery is tested at step S186 where the voltage change is compared with the change in voltage –dv, and if greater, charging is completed at step S188. If the voltage change is less than the change in voltage –dv then the batteries are not fully charged and step S187 returns back to step S181 to start the charging process again. The charging process is repeated until the batteries are fully charged.

Figure 8:
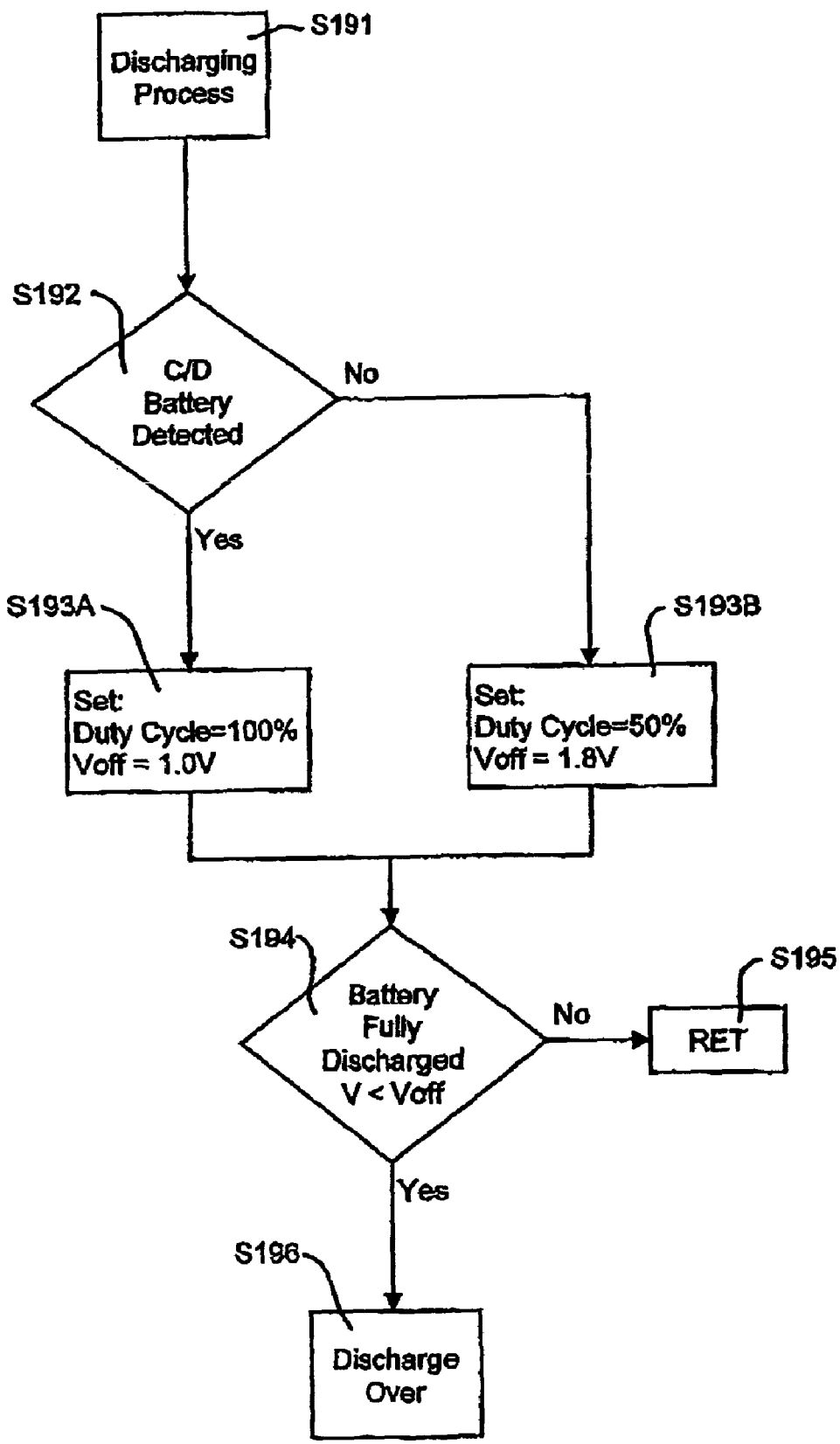
FIG. 8 is a flow diagram of the discharging operation of an embodiment of the present invention.

FIG. 8 shows a flowchart for the discharging process. The discharging process will be described with reference to one charging channel but may be applied to more than one charging channel. The discharging process is started at step S191 (For example, when a signal from the discharge button 300 in FIG. 2 is received). Following step S191, is step S192 which detects whether a C/D size battery is in the charging channel. The detection of the C/D size battery may be in accordance with any of the methods previously described. If a C/D size battery is detected in the charging channel, step S193A is executed and the duty cycle of the discharging controller is set to 100% and the voltage offset Voff is set to 1.0V. The duty cycle capable of being set to 100% because there can only be one C/D battery in each charging channel (due to the physical arrangement of the charging channels, discussed below).

If a C/D size battery is not detected at step S192, then step 193B is executed and the duty cycle is set to 50% and the voltage offset Voff is set to 1.8V. The duty cycle is set to 50% because there can be either one or two AA/AAA batteries in the charging channel (due to the physical arrangement of the charging channels, discussed below).

Following step S193A (for C/D size batteries) or S193B (for AA/AAA size batteries) the voltage across the battery V is compared with the voltage offset Voff and if the voltage across the battery is less than the voltage offset Voff the discharge ends at step S196. Alternatively, if the voltage across the battery is greater than the voltage offset Voff, the discharge process starts again at step S191.

Time divisional multiplex control also applies to discharging. Each charging channel operates independently during discharging. When a user presses the discharge button, the microcontroller 500 produces control signals to all the charging channels. For example, Channel A, upon receiving the control signal from the microcontroller 500, QA1 will open and QA2 will close. The battery will discharge through RA0 and QA2. Since I=V/R, where R (=RA0) is constant, without any control, where two AA/AAA size batteries are present in one charging channel, the battery voltage and hence the discharging current will be twice of those where only one C/D size battery is present in one charging channel. In order to achieve the same discharging current for all different combinations of batteries, the duty cycle of QA2 for the case of two AA/AAA battery is set to 50% of that for the case of one C/D size of battery.

Figure 12:
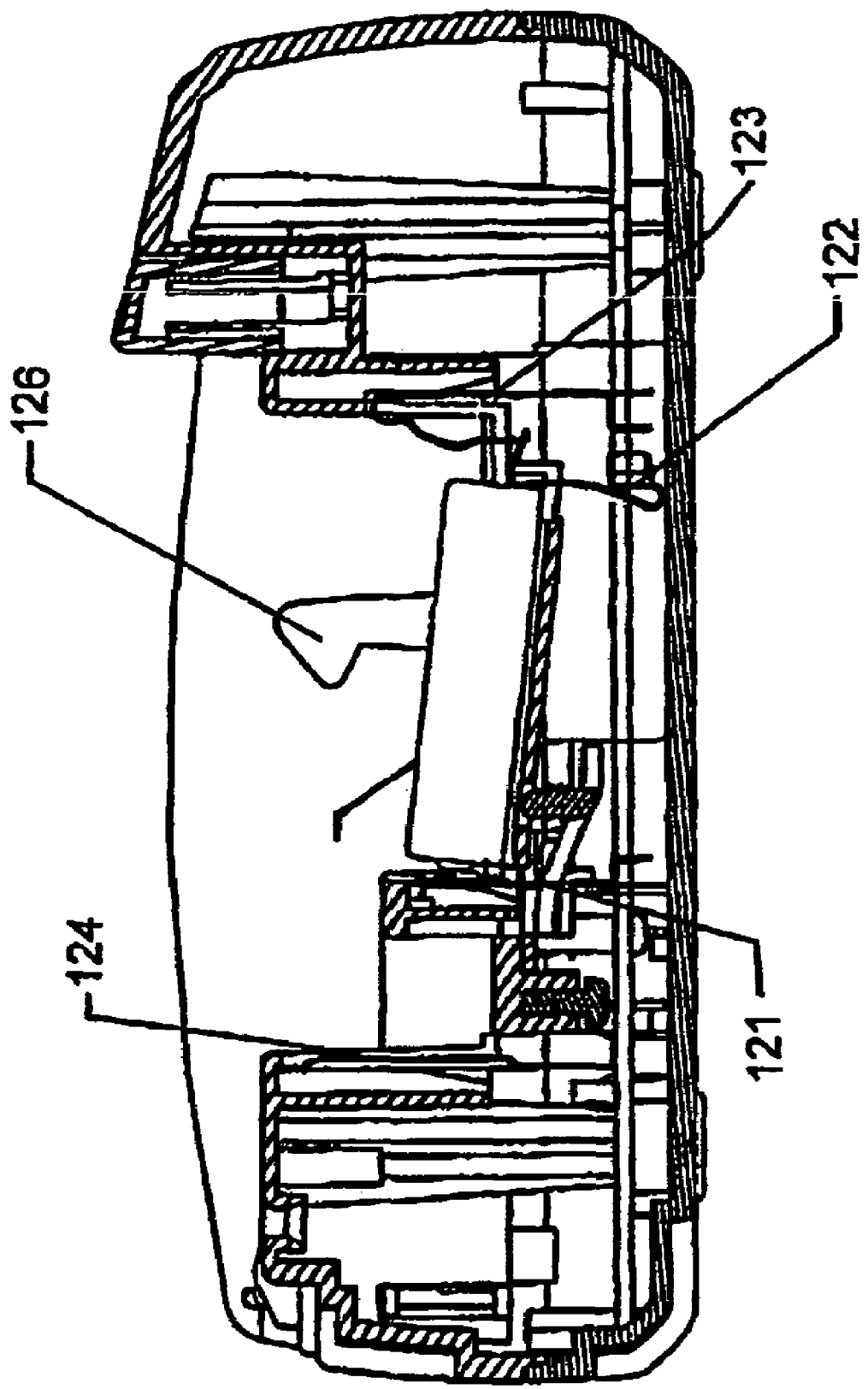
FIG. 12 is a cross-sectional side view of the battery charger of FIG. 9 showing a AAA size rechargeable battery placed in charging/discharging position.

FIG. 12 is a cross-sectional structural side view showing an AAA size battery being charged. An AAA size battery and an AA size battery may use the same positive plate 121. However, a separate negative plate 122 for the AAA size battery and a separate negative plate 123 for the AA size battery are included. C size and D size batteries share the same positive plate 124 and negative plate 126.

Figure 13:
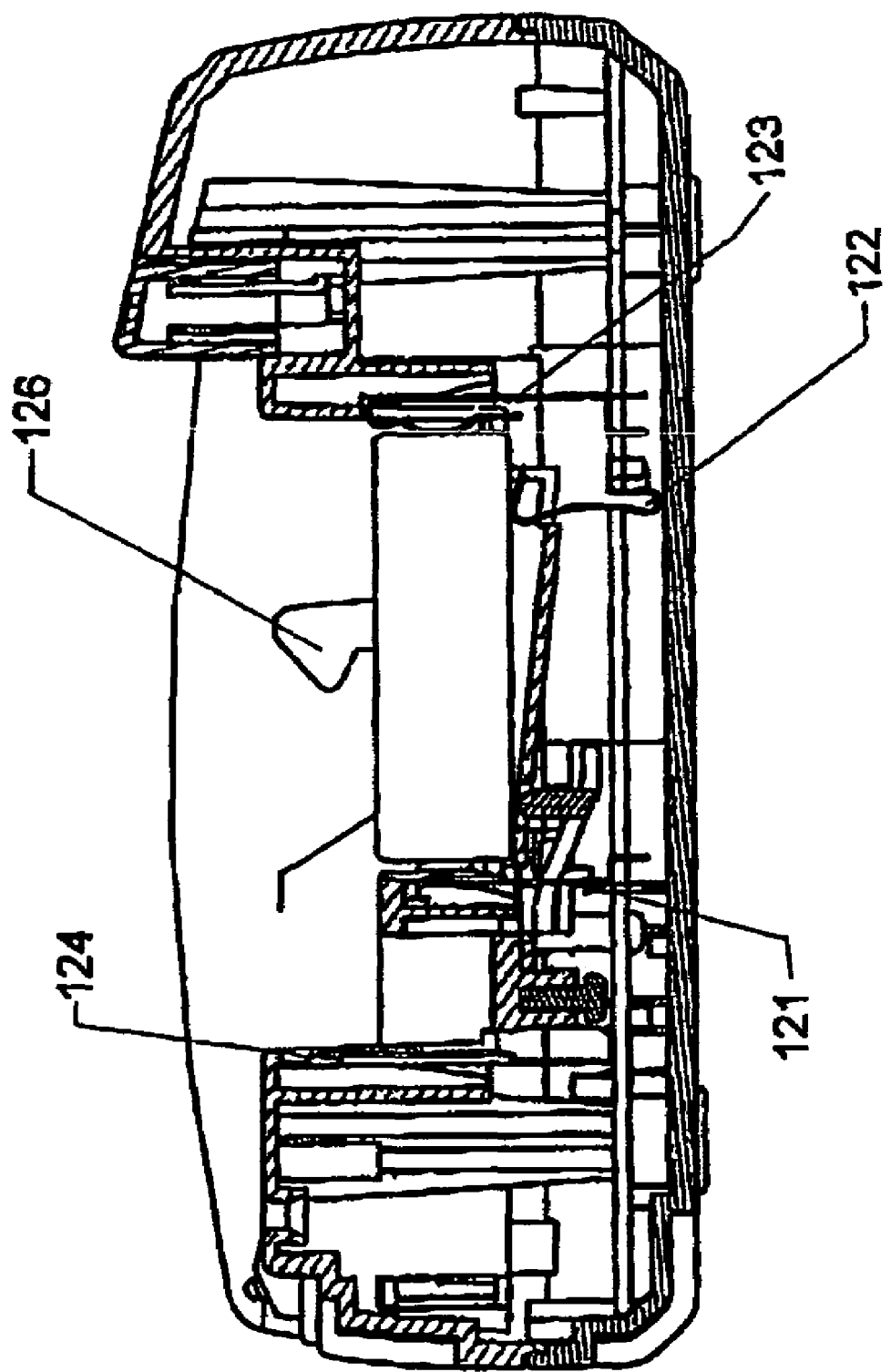
FIG. 13 is a cross-sectional side view of the battery charger of FIG. 9 showing a AA size rechargeable battery placed in charging/discharging position.

FIG. 13 is a cross-sectional structural side view showing an AA size battery being charged.

Figure 14:
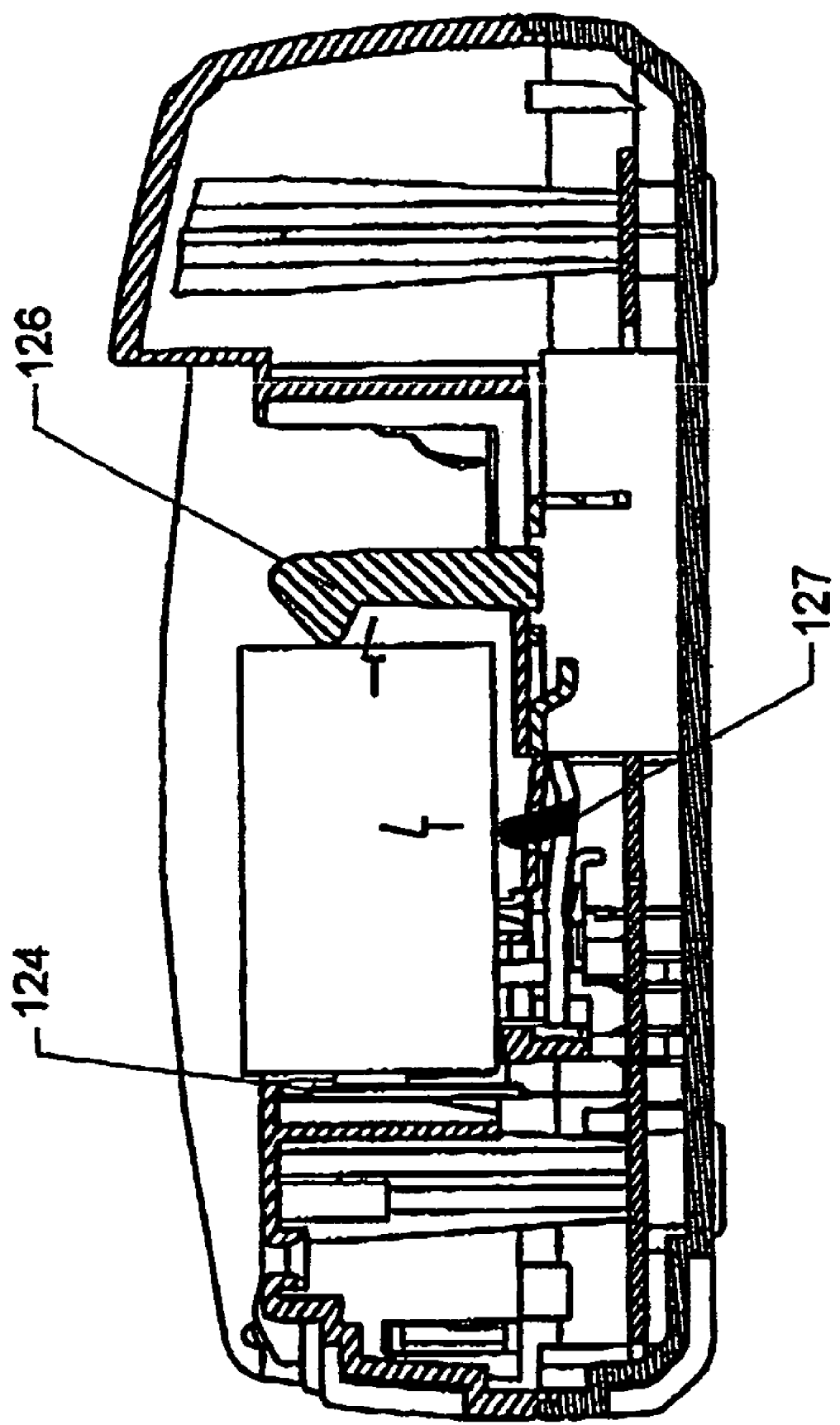
FIG. 14 is a cross-sectional side view of the battery charger of FIG. 9 showing a C or D size rechargeable battery placed in charging/discharging position.

FIG. 14 is a cross-sectional structural side view showing a larger size battery, such as a C size or D size battery, being charged. The C/D negative plate 126 has a sliding structure that allows for the insertion of both C size and D size batteries. Negative plate 126 is biased towards positive plate 124, so that negative plate 126 must be slid in a direction away from positive plate 124 to allow for insertion of a C or D size battery. FIG. 14 also shows projection 127 which is raised when negative plate 126 is slid in a direction away from positive plate 124. When projection 127 is raised, it prevents insertion of an AA or AAA battery.

Figure 9:
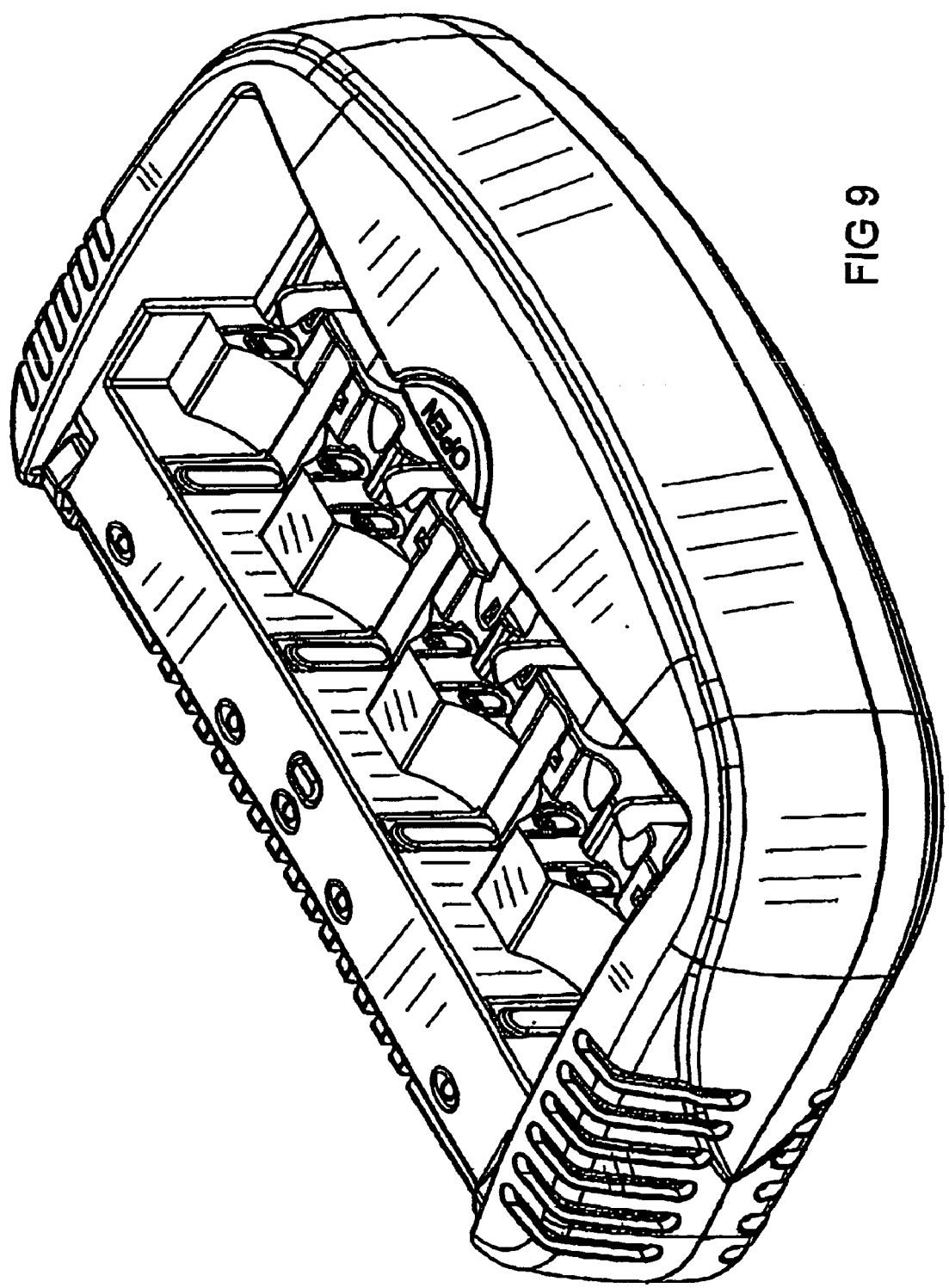
FIG. 9 is a perspective view of a battery charger of the present invention, without any rechargeable batteries placed therein.
Figure 10:
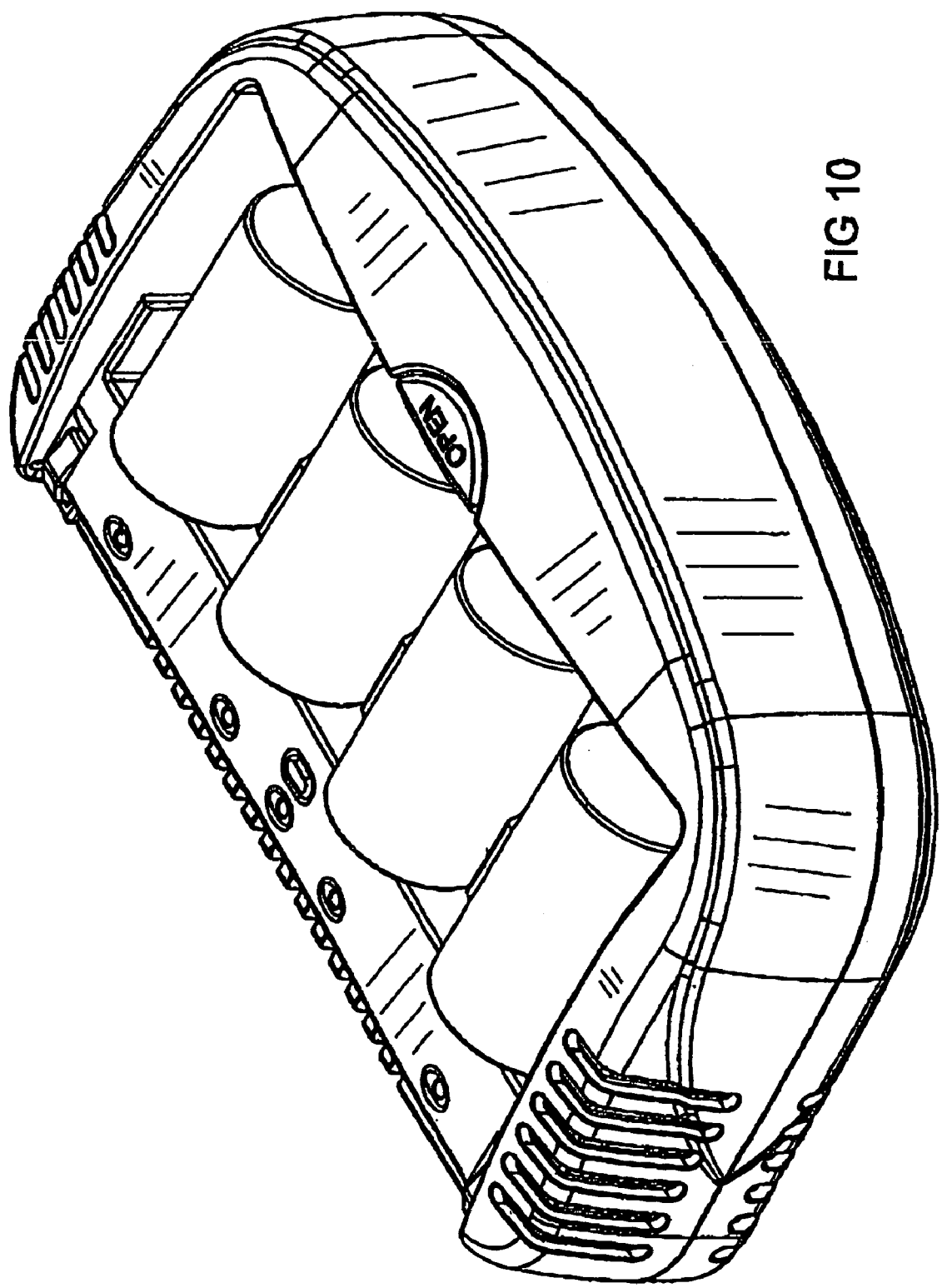
FIG. 10 is a perspective view of the battery charger of FIG. 9 showing four D size rechargeable batteries placed in charging/discharging position.
Figure 11:
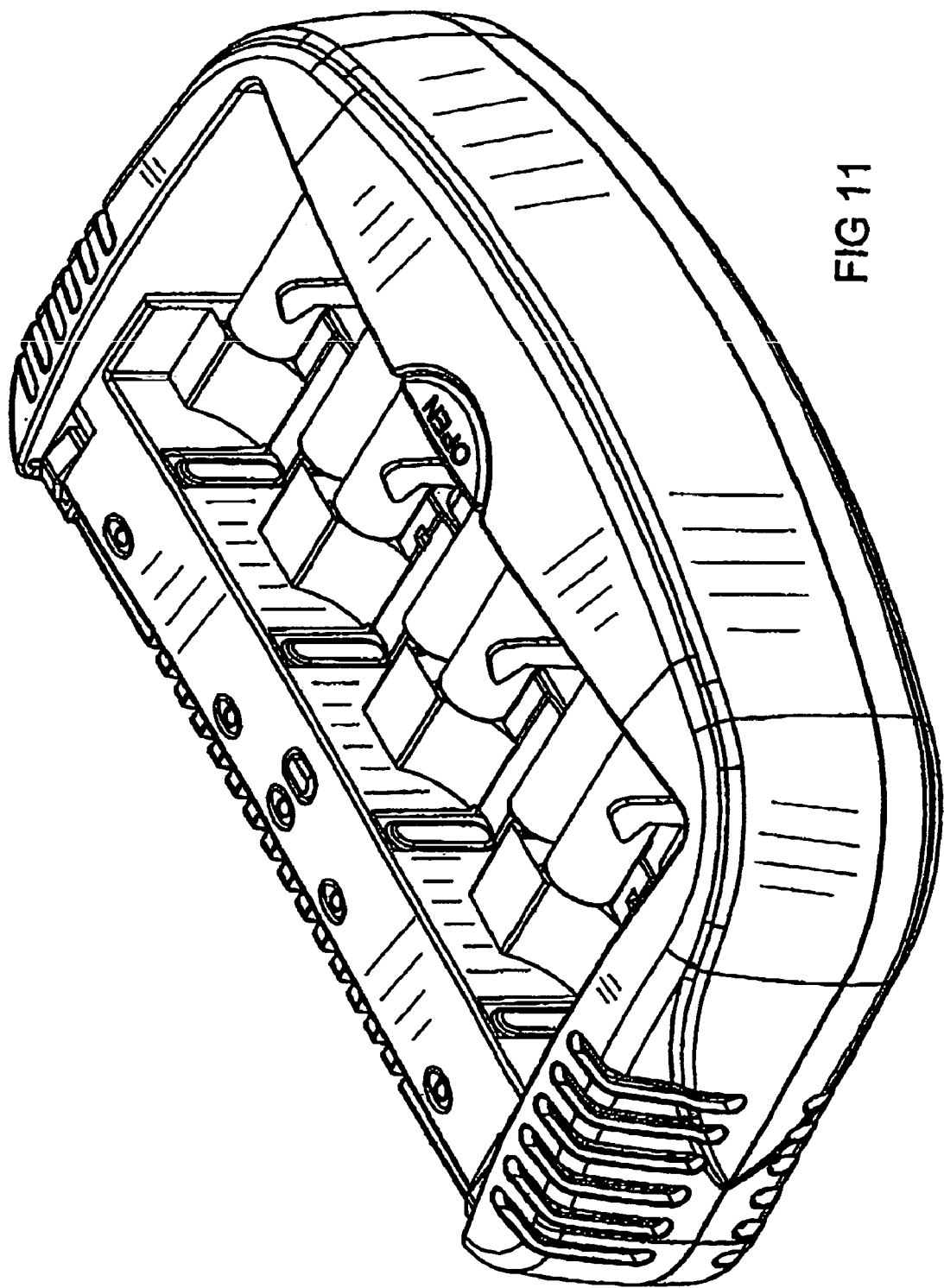
FIG. 11 is a perspective view of the battery charger of FIG. 9 with eight AA size rechargeable batteries placed in charging/discharging position.
Figure 15:
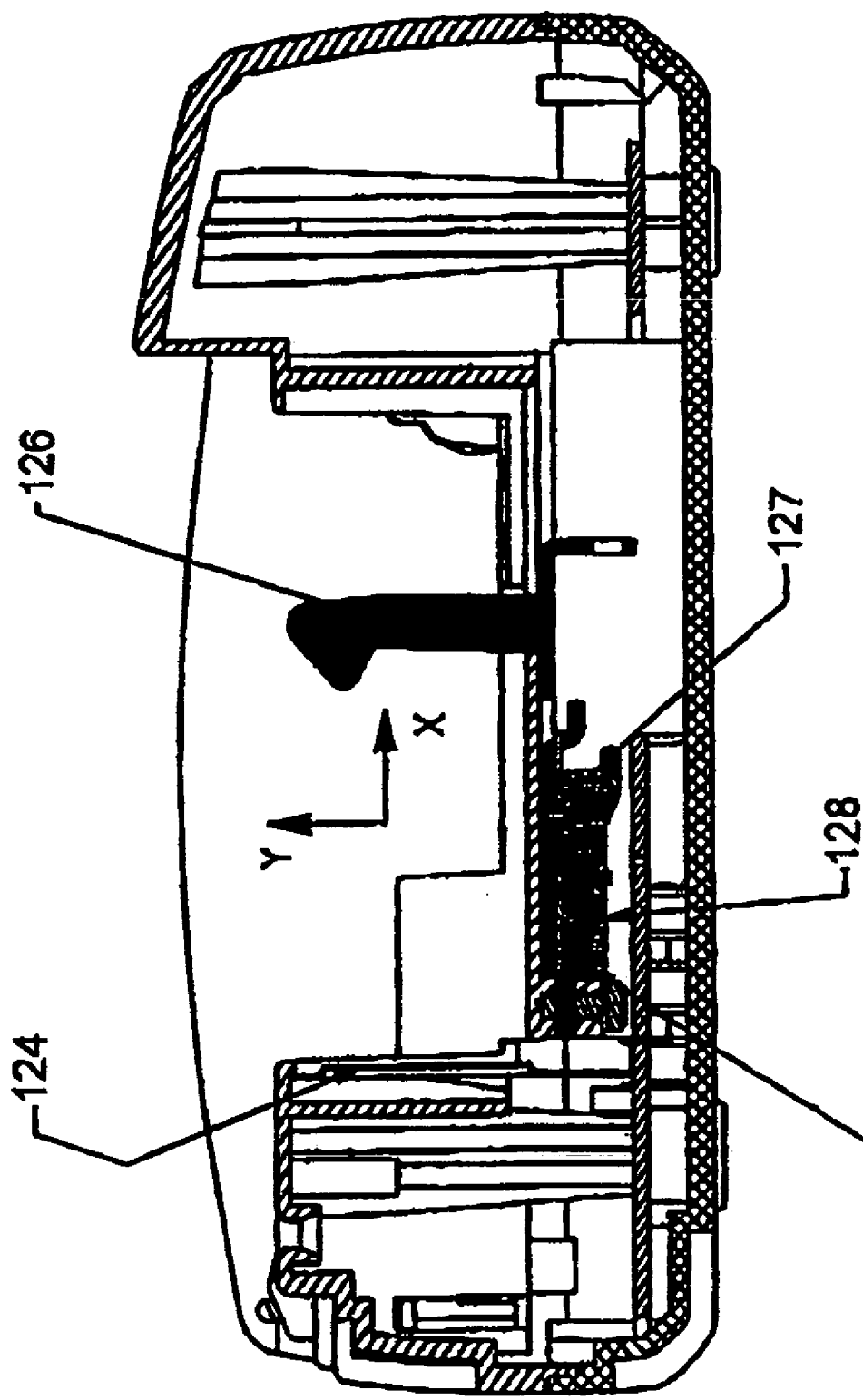
FIG. 15 is a cross-sectional side view of the battery charger of FIG. 9 showing the components of the mechanism for avoiding mixed charging, with the negative plate in a first position.

FIG. 15 is a cross-sectional side view of the battery charger of FIG. 9 showing the components of the mechanism for avoiding mixed charging, with the negative plate 126 in a first position. The negative plate 126 for C or D size battery (i.e. the shaded component shown in FIGS. 15 and 16) can slide along the x-axis. In one embodiment, the negative plate does not move along the y-axis. A pull spring 128 maintains the negative plate 126 in the first position, where the distance between the positive plate 124 and the negative plate 126 is less than the length of a C or D size battery. In order for a C or D size battery to be inserted into the charger, the negative plate 126 is translated along the x-axis, away from the positive plate 124. The pull spring, or coil spring 128, also serves to maintain pressure of the negative plate 126 against the negative end of the battery, when in position, and returns the negative plate 126 from the second position to the first position when the battery is removed from the charger.

A plastic spring 129 for putting up, or dislocating the AA or AAA size battery, is provided. One end of the plastic spring 129 is fixed and the other end may flex in the direction of the y-axis. At the non-fixed end of the plastic spring 129, a tip 127 of the plastic spring is provided. When the non-fixed end of the plastic spring is moved in the direction of the y-axis, the tip extends up into a battery groove. In one embodiment, the plastic spring is a leaf-type spring with a first position as shown in FIG. 15. When the plastic spring is flexed, the plastic spring occupies a second position, as shown in FIG. 16.

In the embodiment illustrated in FIGS. 15 and 16, the negative plate 126 includes a first portion extending in the direction of the y-axis, which is configured for contact with a battery inserted into the charger, and a second portion that lies below the battery receiving area, which may not be fully visible to a user of the battery charger. The second portion includes a ledge or "lip" that is configured for contact with the plastic spring.

When the negative plate is moved from the first position, in the direction of the x-axis to the second position, the ledge of the second portion also moves in this same, generally horizontal direction. As the ledge slides in a direction of the x-axis, the ledge slides against the plastic spring, exerting an upward force, i.e. in the direction of the y-axis, on the plastic spring. When such upward force is applied, the plastic spring is flexed in a generally vertical direction, causing the tip to protrude into the battery groove. Thus, when the negative plate for C or D size battery moves in the direction of the x-axis, which occurs when the C or D size battery is inserted into the charger, the tip of the plastic spring moves upward and protrudes into the battery groove, thereby dislocating any present AA or AAA battery from the battery groove.

Figure 16:
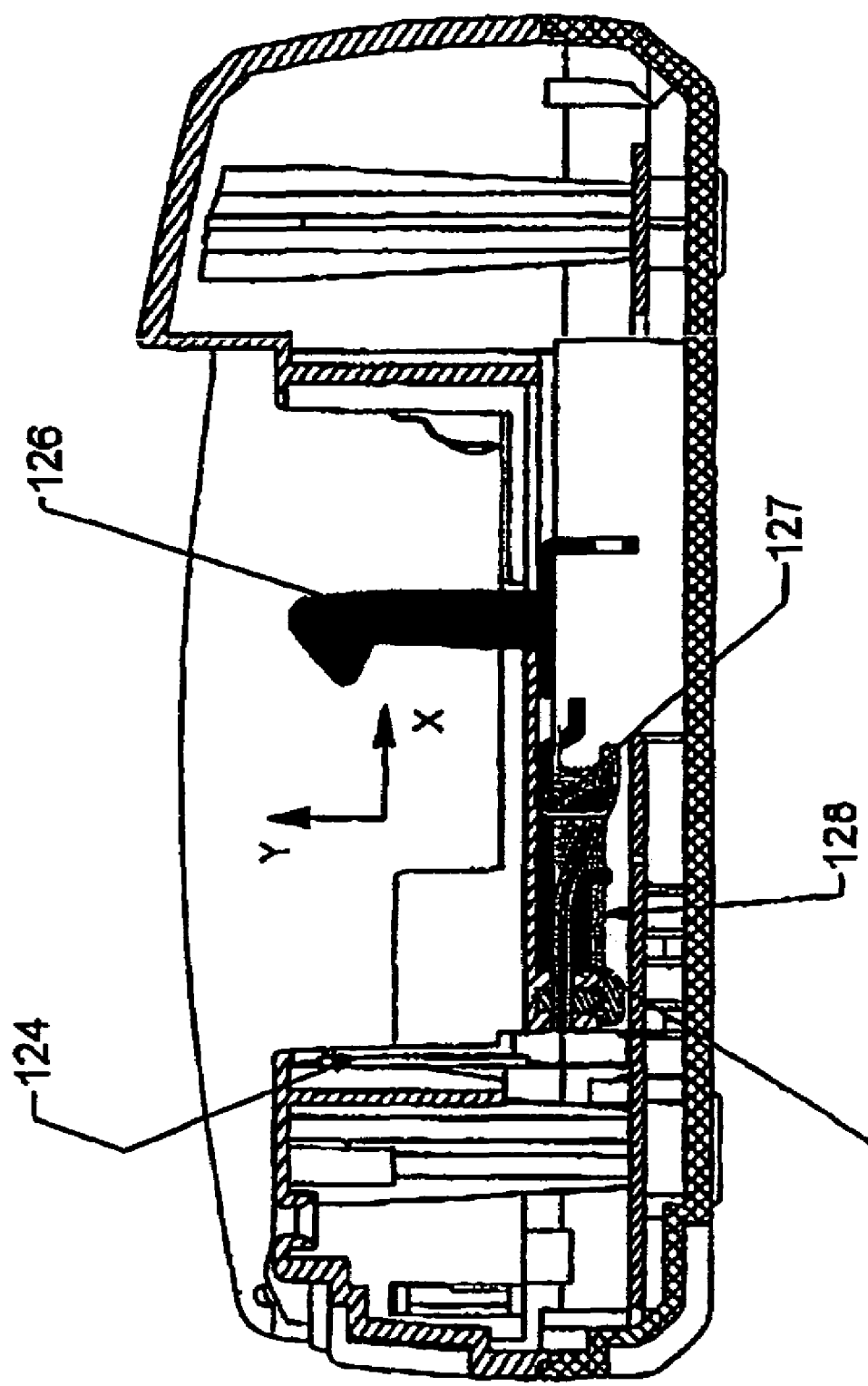
FIG. 16 is a cross-sectional side view of the battery charger of FIG. 9 showing the components of the mechanism for avoiding mixed charging, with the negative plate in a second position.

The force exerted on the plastic spring by the ledge causes the plastic spring to flex into the second position, as shown in FIG. 16. When the negative plate returns to the first position, the force exerted by the ledge is removed, and due to the nature of the plastic spring force, the plastic spring returns to the first position, as shown in FIG. 15.

FIG. 16 is a cross-sectional side view of the battery charger of FIG. 9 showing the components of the mechanism for avoiding mixed charging, with the negative plate in a second position. The negative plate is located in the second position and the tip of the spring is extended into the battery groove. A AA size battery or a AAA size battery which has been placed in the groove above the frame will therefore be pushed upward (i.e. in the direction of the y-axis) causing the battery to be moved out of charging/discharging contact with the battery charger. Therefore, the purpose of avoiding mixed charging can thereby be achieved.

In the illustrated embodiment, for each charging channel, the mechanism for dislocating the AA or AAA size battery is located in at least one of the first and second grooves. Because of the circuit design as shown in FIG. 2, BA1 and BA2 (or BA3 and BA4) are located in one circuit. Therefore, when one of the batteries BA1 and BA2 (or one of BA3 and BA4) is dislocated, the circuit is broken, and current will not flow through either BA1 or BA2 (or BA3 or BA4).

Figure 17:
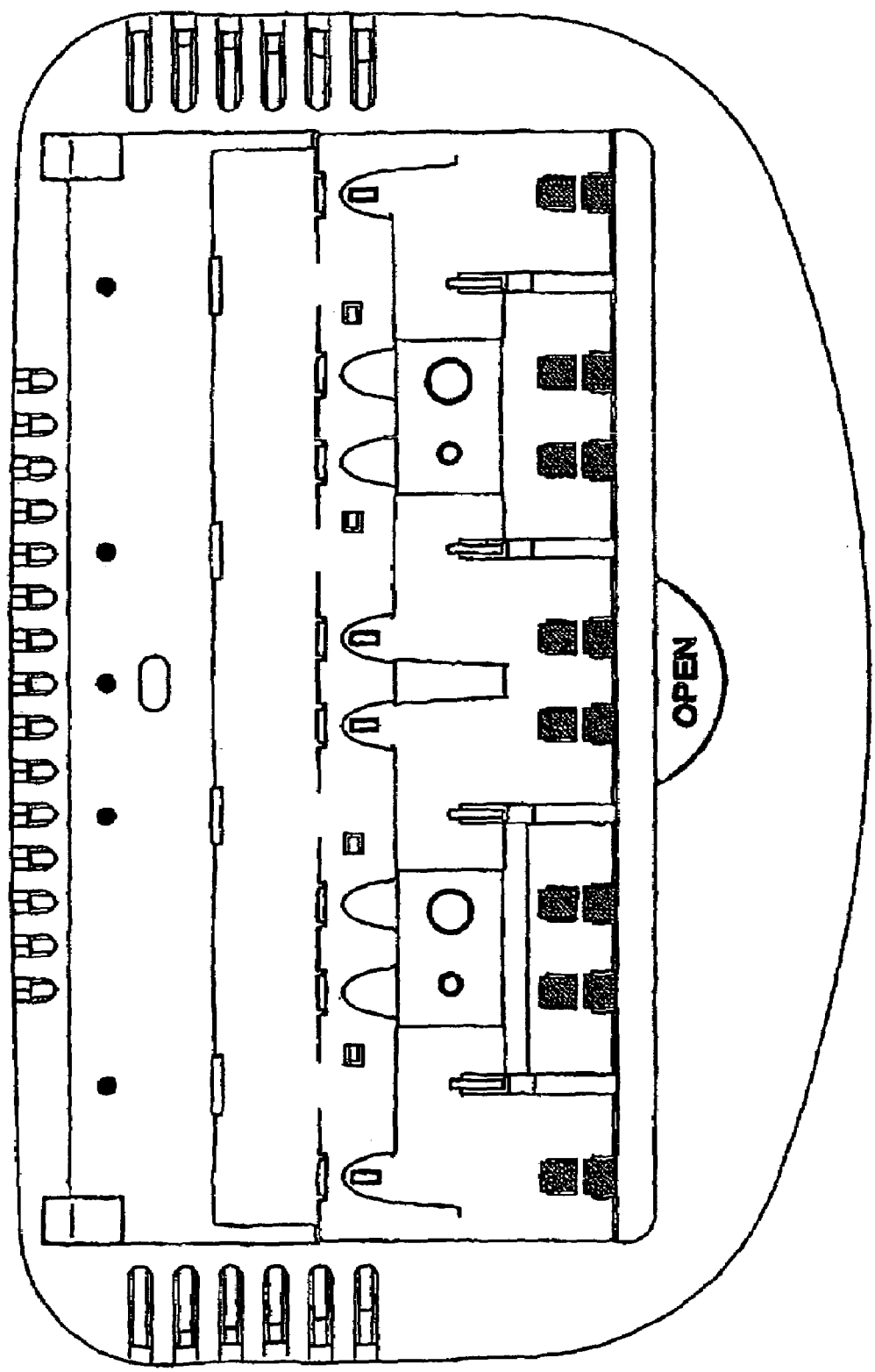
FIG. 17 is a top view of the battery charger of FIG. 9, without any rechargeable batteries placed therein.

FIG. 17 is a top view of the battery charger of FIG. 9, without any rechargeable batteries placed therein. From the top view of the battery charger, Channel 1, Channel 2, Channel 3, and Channel 4 are generally identified. Channel 1, Channel 2, Channel 3, and Channel 4 correspond generally to Channel A, Channel B, Channel C, and Channel D of the circuit diagram shown in FIG. 2, respectively. However, it is not necessary for a particular physical location in the battery charger to be related to a specific charging channel of the circuit diagram. The correlation of physical charging channels to logical charging channels is primarily for illustration purposes. In one embodiment, the number of physical charging channels in the battery charger corresponds to the number of logical charging channels in the circuit design of the battery charger. The structure of the charging channels will be described with reference to Channel 1, each of the charging channels being similar in design. Channel 1 includes a first groove 100 and a second groove 105, each configured for receiving AA and AAA size batteries. The area between the first groove and the second groove is configured for receiving either a C or D size battery. The first groove 100 corresponds to BA1 and BA3 of the circuit diagram of FIG. 2, and the second groove 105 corresponds to BA2 and BA4 of the circuit diagram of FIG. 2. The area between the first and second grooves corresponds to BA0 of the circuit diagram of FIG. 2.

FIG. 17 also illustrates the structural design of the battery charger. In one embodiment, the present invention uses the space required for charging four larger-size batteries, such as C or D size, and provides for the charging of eight smaller-size batteries, such as AA or AAA size, in a variety of combinations. The C and D positive plate 110 and the C and D negative plate 115 lie generally in the middle of Channel 1. First and second AA and AAA positive plates 120, 125 are located at one end of the first and second grooves 100, 105, respectively. First and second AA negative plates 130, 135 and first and second AAA negative plates 140, 145 are located at the opposing end of the first and second grooves 100, 105. AA and AAA size batteries are charged in the same groove, sharing positive plates 120. 125 but having separate negative plates. In the illustrated embodiment, the AA negative plates 130, 135 are generally longitudinally aligned with the AAA negative plates 140, 145. Other configurations that allow the sharing of the positive plates are suitable. Also, other embodiments could also include negative plates that are also shared by the AA and AAA size batteries, or also include separate positive plates for each of the AA and AAA size batteries. The first and second grooves 100, 105 are nested around and underneath the area that receives the C or D sized battery (as can also be seen in FIGS. 9-14) making efficient use of space.

While the embodiments of the present invention have been illustrated in detail, it should be apparent that modifications and adaptations to these embodiments may occur to one skilled in the art without departing from the scope of the present invention. For example, while a certain combination of springs and parts have been described, other springs and parts of various types and combinations may also be used to accomplish a similar purpose. For example, while a plastic leaf spring is described, a spring made of metal alloy or other polymer materials may be used. Also, spring types other than those described may be used. Other devices may be substituted to accomplish the same purpose as the negative plate and the plastic spring, such as coil springs, discs, gears, struts, and the like. Also, while the above described embodiments illustrate one mechanism for displacing the AA or AAA size battery from position when a C or D size battery is placed into the charger, other embodiments be used. For example, the C or D size battery may be displaced when a AA or AAA size battery is inserted into the charger. Also, the physical structure of the battery charger itself may be such that simultaneous insertion of certain mixed battery combinations may not be permitted.

What is claimed is;:

1. A battery charger including:
    an apparatus for accommodating a plurality of batteries to be recharged;
    the apparatus including a plurality of charging channels, each charging channel configured to charge at least two batteries of sizes different from one another, and to receive at one time at least one battery of the plurality of batteries;
    electrical connectors within the channels and positioned for charging the at least one battery in each of the charging channels;
    a battery size detector for each channel for detecting a size of the at least one battery inserted in each channel;
    charging electronic circuitry operable for applying, independently to each channel, charging power appropriate to the battery size detected for the channel so as to charge the plurality of batteries; and
    discharging electronic circuitry operable to fully discharge the plurality of batteries by controlling a duty cycle of each charging channel based on the size of the at least one battery detected in each charging channel,
    wherein the charging electronic circuitry and the discharging electronic circuitry are each separately user-selectable so that the charging and the discharging are each separately and independently user-selectable.

2. The battery charger according to claim 1, further including a microcontroller in communication with the charging channels, wherein the microcontroller controls the charging power applied to each charging channel by controlling the level of current in each charging channel.

3. A battery charger according to claim 2, wherein the microcontroller controls the charging power applied to each charging channel by controlling the duty cycle of each charging channel.

4. A battery charger according to claim 2, wherein each of the charging channels is configured to selectively charge at one time one size of battery selected from a group consisting of a C size battery, a D size battery, an AA size battery, and an AAA size battery.

5. A battery charger according to claim 4, wherein each of the charging channels is configured to receive either two AA size batteries or two AAA size batteries.

6. The battery charger according to claim 1 wherein each of the charging channels includes a mechanism which is activated when a C or D size battery is inserted in the charging channel, and wherein the mechanism when activated prevents an AA or AAA size battery from being inserted in the charging channel.

7. A battery charger including:
    an apparatus for accommodating a plurality of batteries to be recharged;
    the apparatus including a plurality of charging channels, each charging channel configured to charge and to discharge at least two batteries of sizes different from one another, and to receive at one time at least one battery of the plurality of batteries;
    electrical connectors within each of the charging channels and positioned for selectively charging at one time one C size battery, one D size battery, two AA size batteries, or two AAA size batteries in each of the charging channels;
    a battery size detector for each charging channel and operable for detecting a size of the at least one battery inserted in each channel;
    charging electronic circuitry operable for applying, independently to each channel, charging power appropriate to the battery size detected for each channel so as to charge the plurality of batteries; and
    discharging electronic circuitry operable to fully discharge the plurality of batteries by controlling a duty cycle of each charging channel based on the size of the at least one battery detected in the charging channel, wherein the charging electronic circuitry and the discharging electronic circuitry are each separately user-selectable so that the charging and the discharging are each separately and independently user-selectable.

8. A battery charger according to claim 7, further including one or more additional sets of electrical connectors for charging 9-volt batteries.

9. A battery charger including:
    an apparatus for accommodating a plurality of batteries to be recharged;
    the apparatus including a plurality of charging channels, each charging channel configured to charge and to discharge batteries of sizes different from one another, and to receive at one time at least one battery of the plurality of batteries;
    electrical connectors within the charging channels and operable for charging the at least one battery in each of the charging channels;
    a battery size detector for each charging channel and operable for detecting a size of the at least one battery inserted in each charging channel;
    charging electronic circuitry operable for applying, independently to each channel, charging power appropriate to the battery size detected for the channel so as to charge the plurality of batteries; and
    discharging electronic circuitry operable to fully discharge the plurality of batteries by controlling a duty cycle of each charging channel based on the size of the at least one battery detected in each charging channel,
    wherein the charging electronic circuitry and the discharging electronic circuitry are each separately user-selectable so that the charging and the discharging are each separately and independently user-selectable; and
    a mechanism to prevent an AA or AAA size battery from being inserted in each charging channel, wherein the mechanism of the charging channel is activated when a C or D size battery is inserted in the charging channel.

10. The battery charger according to claim 1, further comprising a discharge button operable by an operator of the battery charger to activate the discharge electronic circuitry to discharge the battery.

11. The battery charger according to claim 7, further comprising a discharge button operable by an operator of the battery charger to activate the discharge electronic circuitry to discharge the battery.

12. The battery charger according to claim 9, further comprising a discharge button operable by an operator of the battery charger to activate the discharge electronic circuitry to discharge the battery.

* * * * *